US011864133B2

United States Patent
Liu et al.

(10) Patent No.: US 11,864,133 B2
(45) Date of Patent: Jan. 2, 2024

(54) SYNCHRONIZATION SIGNAL BLOCK TRANSMISSION METHOD AND COMMUNICATIONS APPARATUS

(71) Applicant: HUAWEI TECHNOLOGIES CO., LTD., Guangdong (CN)

(72) Inventors: Zhe Liu, Shanghai (CN); Hao Tang, Shanghai (CN); Jinlin Peng, Shanghai (CN); Guohua Zhou, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 437 days.

(21) Appl. No.: 17/236,622

(22) Filed: Apr. 21, 2021

(65) Prior Publication Data
US 2021/0243706 A1    Aug. 5, 2021

Related U.S. Application Data

(63) Continuation of application No. PCT/CN2019/112321, filed on Oct. 21, 2019.

(30) Foreign Application Priority Data

Oct. 24, 2018 (CN) .......................... 201811241581.2

(51) Int. Cl.
*H04W 56/00* (2009.01)
*H04L 27/26* (2006.01)
(Continued)

(52) U.S. Cl.
CPC ..... *H04W 56/001* (2013.01); *H04L 27/26025* (2021.01); *H04W 72/0446* (2013.01); *H04W 72/0453* (2013.01); *H04W 72/30* (2023.01)

(58) Field of Classification Search
CPC ........... H04W 56/001; H04W 72/0446; H04W 72/0453; H04W 72/30; H04W 56/0015;
(Continued)

(56) References Cited

U.S. PATENT DOCUMENTS

| | | |
|---|---|---|
| 2018/0084593 A1 | 3/2018 | Chen et al. |
| 2018/0123849 A1 | 5/2018 | Si et al. |

(Continued)

FOREIGN PATENT DOCUMENTS

| | | |
|---|---|---|
| CN | 107547463 A | 1/2018 |
| CN | 108023695 A | 5/2018 |

(Continued)

OTHER PUBLICATIONS

Nokia et al: SS Bandwidth Numerology and Multiplexing 3GPP Draft;R1-1701056 Jan. 16-20, 2017 XP051202359, total 8 pages.
(Continued)

*Primary Examiner* — Kyaw Z Soe
(74) *Attorney, Agent, or Firm* — WOMBLE BOND DICKINSON (US) LLP

(57) ABSTRACT

Embodiments of this application provide a synchronization signal block transmission method and a communications apparatus. The method includes: A network device sends an SSB to a terminal device in a resource position of the SSB. Correspondingly, the terminal device receives the SSB. In this process, a symbol included in the resource position of the SSB does not overlap with an uplink symbol in a plurality of self-contained slot structures as much as possible. This method can reduce a probability that the symbol included in the resource position of the SSB conflicts with an uplink symbol in as many self-contained slot structures as (Continued)

possible, to avoid cross interference, and therefore can support reliable transmission in as many self-contained slot structures as possible.

15 Claims, 13 Drawing Sheets

(51) Int. Cl.
*H04W 72/0446* (2023.01)
*H04W 72/0453* (2023.01)
*H04W 72/30* (2023.01)

(58) Field of Classification Search
CPC ............. H04L 27/26025; H04L 5/0007; H04L 5/0048; H04L 5/0008
See application file for complete search history.

(56) References Cited

U.S. PATENT DOCUMENTS

| | | | | |
|---|---|---|---|---|
| 2019/0215834 | A1* | 7/2019 | Novlan | H04L 5/0094 |
| 2020/0221404 | A1* | 7/2020 | Takeda | H04L 27/26025 |
| 2020/0288442 | A1* | 9/2020 | Murayama | H04W 72/0453 |
| 2021/0120469 | A1* | 4/2021 | Yuan | H04W 36/0072 |
| 2022/0078066 | A1* | 3/2022 | Xu | H04L 5/06 |

FOREIGN PATENT DOCUMENTS

| | | |
|---|---|---|
| CN | 108496397 A | 9/2018 |
| CN | 108702707 A | 10/2018 |

OTHER PUBLICATIONS

Samsung, Frame structure for NR-U. 3GPP TSG RAN WG1 Meeting #92, Sanya, China, Apr. 16, 20, 2018, R1-1804403, 3 pages.
3GPP TS 22.261 V16.5.0 (Sep. 2018), 3rd Generation Partnership Project; Technical Specification Group Services and System Aspects; Service requirements for the 5G system; Stage 1(Release 16), 67 pages.
Ericsson, Remaining details on TRS. 3GPP TSG-RAN WG1 Meeting 90bis,Prague, CZ, Oct. 9, 13, 2017 , R1-1718451, 23 pages.
3GPP TS 38.213 V15.3.0 (Sep. 2018), 3rd Generation Partnership Project; Technical Specification Group Radio Access Network; NR; Physical layer procedures for control(Release 15), 101 pages.
3GPP TS 38.211 V15.3.0 (Sep. 2018) 3rd Generation Partnership Project; Technical Specification Group Radio Access Network; NR; Physical channels and modulation(Release 15) 96 pages.

* cited by examiner

SYNCHRONIZATION SIGNAL BLOCK TRANSMISSION METHOD AND COMMUNICATIONS APPARATUS

CROSS-REFERENCE TO RELATED APPLICATIONS

This application is a continuation of International Application No. PCT/CN2019/112321, filed on Oct. 21, 2019, which claims priority to Chinese Patent Application No. 201811241581.2, filed on Oct. 24, 2018. The disclosures of the aforementioned applications are hereby incorporated by reference in their entireties.

TECHNICAL FIELD

Embodiments of this application relate to the field of communications technologies, and in particular, to a synchronization signal block transmission method and a communications apparatus.

BACKGROUND

In a wireless communications system, a network device sends a synchronization signal block (SSB) to a terminal device, and the terminal device synchronizes with the network device based on the SSB. The SSB may include a primary synchronization signal (PSS), a secondary synchronization signal (SSS), and a physical broadcast channel (PBCH).

When sending the SSB to the terminal device, the network device maps the SSB to a time-frequency resource of a particular size for sending. In one embodiment, the time-frequency resource of the particular size occupies 20 resource blocks (RB) in frequency domain, and occupies four orthogonal frequency division multiplexing (OFDM) symbols in time domain. Each RB includes 12 consecutive subcarriers in frequency domain. A subcarrier spacing is a basic unit in frequency domain, and the subcarrier spacing may be 15 kHz, 30 kHz, 60 kHz, 120 kHz, or the like. To support a plurality of service types or a plurality of service scenarios, a design in which a plurality of subcarrier spacings coexist on one carrier is proposed. In this design, different subcarrier spacings may be configured in frequency domain within a same transmission time period in time domain. When a plurality of subcarrier spacings coexist, to reduce interference between an uplink and a downlink (in a case of a same time domain, if some RBs are used for downlink transmission and the other RBs are used for uplink transmission in frequency domain, cross interference between the uplink and the downlink may be caused), in a same transmission time period, only uplink transmission or downlink transmission needs to be performed between all different subcarrier spacings of a carrier. For example, transmission of an SSB is downlink transmission. On four OFDM symbols used for transmitting the SSB, another RB on a carrier can be used to transmit only a downlink signal or a downlink channel or transmit no signal, but cannot be used to transmit an uplink signal or an uplink channel.

SUMMARY

This application provides a synchronization signal block transmission method and a communications apparatus, to ensure that another terminal device can obtain an SSB to access a system while ensuring data transmission reliability.

According to a first aspect, an embodiment of this application provides a synchronization signal block transmission method, including:

receiving a synchronization signal block (SSB) sent by a network device in a resource position of the SSB, where the resource position of the SSB is included in a candidate resource position set of the SSB, and the SSB includes a primary synchronization signal (PSS), a secondary synchronization signal (SSS), and a physical broadcast channel (PBCH), where one resource position in the candidate resource position set is mapped to one symbol in time domain, the PSS, the SSS, and the PBCH are frequency-division multiplexed in the resource position, and a subcarrier spacing corresponding to the resource position is 15 kHz, 30 kHz, or 60 kHz.

In the method, the candidate resource position set includes one or more (candidate) resource positions, and a resource in each resource position is a candidate resource used by the network device to send an SSB to a terminal device. One resource position is mapped to one symbol in time domain. Therefore, when a candidate resource position of an SSB is designed, a time domain length of the resource position of the SSB is reduced, so that a symbol to which the resource position of the SSB is mapped does not overlap with uplink transmission symbols in a plurality of self-contained slot structures as much as possible, thereby avoiding cross interference. Therefore, this design can support reliable transmission in more self-contained slot structures. Further, because the reliable transmission is supported, a retransmission probability can be reduced. Therefore, a latency of data transmission in the self-contained slot structure can be reduced.

In one embodiment, the subcarrier spacing is 15 kHz, the candidate resource position set is a first set or a subset of the first set, and indexes of a symbol in the first set are $\{0, 7, 14, 21\}+28\times a$, where $a \geq 0$ and a is an integer.

In one embodiment, the subcarrier spacing is 30 kHz, the candidate resource position set is a second set or a subset of the second set, and indexes of a symbol in the second set are $\{0, 1, 7, 8, 14, 15, 21, 22\}+28\times b$.

In one embodiment, the subcarrier spacing is 60 kHz, the candidate resource position set is a third set or a subset of the third set, and indexes of a symbol in the third set are $\{0, 1, 2, 3, 7, 8, 9, 10, 14, 15, 16, 17, 21, 22, 23, 24\}+28\times c$, where $c \geq 0$ and c is an integer.

According to the foregoing method, downlink symbols in a slot may be the first several symbols in the slot, to ensure that a network side dynamically changes a quantity of uplink symbols and a quantity of downlink symbols according to an actual requirement. In a possible scenario, there may be at least three self-contained slots with a subcarrier spacing of 60 kHz within 0.5 ms, to ensure low-latency and high-reliability transmission of a service corresponding to the subcarrier spacing of 60 kHz, and to enable another terminal device to obtain the SSB to access a system.

In one embodiment, a quantity of resource blocks RBs to which the SSB is mapped in frequency domain is less than or equal to 72, where the PSS and the SSS each are mapped to 12 RBs in frequency domain, and a quantity of RBs to which the PBCH is mapped in frequency domain is less than or equal to 48.

In the method, locations of the PBCH, the SSS, and the PSS in the SSB that occupies one symbol are designed in frequency domain, to flexibly set a format of the SSB. According to the method, downlink symbols in a slot may be the first several symbols in the slot, to ensure that a network side dynamically changes a quantity of uplink symbols and a quantity of downlink symbols according to an actual requirement. In a possible scenario, there may be at least three self-contained slots with a subcarrier spacing of 60 kHz within 0.5 ms, to ensure low-latency and high-reliability transmission of a service corresponding to the subcarrier spacing of 60 kHz, and to enable another terminal device to obtain the SSB to access a system.

According to a second aspect, an embodiment of this application provides a synchronization signal block transmission method, including:

receiving a synchronization signal block (SSB) sent by a network device in a resource position of the SSB, where the resource position of the SSB is included in a candidate resource position set of the SSB, and the SSB includes a primary synchronization signal (PSS), a secondary synchronization signal (SSS), and a physical broadcast channel (PBCH), where one resource position in the candidate resource position set is mapped to two consecutive symbols in time domain, the PSS, the SSS, and the PBCH are frequency-division multiplexed and time-division multiplexed in the resource position, and a subcarrier spacing corresponding to the resource position is 30 kHz or 60 kHz.

In the method, the SSB is sent by using 30 kHz or 60 kHz, the candidate resource position set of the SSB includes one or more (candidate) resource positions, and a resource in each resource position is a candidate resource used by the network device to send an SSB to a terminal device. One resource position is mapped to two symbols in time domain. Therefore, when a candidate resource position of an SSB is designed, a time domain length of the resource position of the SSB is reduced, so that a symbol to which the resource position of the SSB is mapped does not overlap with uplink transmission symbols in a plurality of self-contained slot structures as much as possible, thereby avoiding cross interference. Therefore, this design can support reliable transmission in more self-contained slot structures. Further, because the reliable transmission is supported, a retransmission probability can be reduced. Therefore, a latency of data transmission in the self-contained slot structure can be reduced.

In one embodiment, the subcarrier spacing is 30 kHz, a set of indexes of the first symbol of the resource position is a fourth set or a subset of the fourth set, and indexes of a symbol that are included in the fourth set are {0, 7, 14, 21}+28×b, where b≥0 and b is an integer.

In one embodiment, the subcarrier spacing is 60 kHz, a set of indexes of the first symbol of the resource position is a fifth set or a subset of the fifth set, and indexes of a symbol that are included in the fifth set are {0, 2, 7, 9, 14, 16, 21, 23}+28×c, where c≥0 and c is an integer.

According to the method, downlink symbols in a slot may be the first several symbols in the slot, to ensure that a network side dynamically changes a quantity of uplink symbols and a quantity of downlink symbols according to an actual requirement. In a possible scenario, there may be at least three self-contained slots with a subcarrier spacing of 60 kHz within 0.5 ms, to ensure low-latency and high-reliability transmission of a service corresponding to the subcarrier spacing of 60 kHz, and to enable another terminal device to obtain the SSB to access a system.

In one embodiment, a quantity of resource blocks RBs to which the SSB is mapped in frequency domain is less than or equal to 36; and that the PSS, the SSS, and the PBCH are frequency-division multiplexed and time-division multiplexed in the resource position includes:

the PSS and the SSS are time-division multiplexed, the PSS and the SSS are mapped to 12 same RBs in frequency domain, the PBCH and the PSS are frequency-division multiplexed, and a quantity of RBs to which the PBCH is mapped in frequency domain is less than or equal to 24;

the PSS and the SSS are frequency-division multiplexed, the PSS and the SSS each are mapped to 12 RBs in frequency domain, the PBCH and the PSS are time-division multiplexed, and a quantity of RBs to which the PBCH is mapped in frequency domain is less than or equal to 36; or the PBCH includes a first part and a second part, the second part includes a first block and a second block, the first block, the second block, the PSS, and the SSS are frequency-division multiplexed, the first part and the PSS are time-division multiplexed, the PSS and the SSS each are mapped to 12 RBs in frequency domain, the first block and the second block each are mapped to six RBs in frequency domain, and a quantity of RBs to which the second part is mapped in frequency domain is less than or equal to 36.

According to the synchronization signal block transmission method provided in this embodiment, locations of the PBCH, the SSS, and the PSS in the SSB that occupies two symbols are adjusted in frequency domain and in time domain, to flexibly set a format of the SSB. According to the method, downlink symbols in a slot may be the first several symbols in the slot, to ensure that a network side dynamically changes a quantity of uplink symbols and a quantity of downlink symbols according to an actual requirement. In a possible scenario, there may be at least three self-contained slots with a subcarrier spacing of 60 kHz within 0.5 ms, to ensure low-latency and high-reliability transmission of a service corresponding to the subcarrier spacing of 60 kHz, and to enable another terminal device to obtain the SSB to access a system.

According to a third aspect, an embodiment of this application provides a synchronization signal block transmission method, including:

receiving a synchronization signal block (SSB) sent by a network device in a resource position of the SSB, where the resource position of the SSB is included in a candidate resource position set of the SSB, and the SSB includes a primary synchronization signal (PSS), a secondary synchronization signal (SSS), and a physical broadcast channel (PBCH), where one resource position in the candidate resource position set is mapped to four symbols in time domain, the PSS, the SSS, and the PBCH are frequency-division multiplexed and time-division multiplexed in the resource position, and a subcarrier spacing corresponding to the resource position is 30 kHz or 60 kHz.

In the method, the SSB is sent by using 30 kHz or 60 kHz, the candidate resource position set of the SSB includes one or more (candidate) resource positions, and a resource in each resource position is a candidate resource used by the network device to send an SSB to a terminal device. One resource position is mapped to four symbols in time domain. Therefore, when a candidate resource position of an SSB is designed, a time domain length of the resource position of the SSB is reduced, so that a symbol to which the resource position of the SSB is mapped does not overlap with uplink transmission symbols in a plurality of self-contained slot structures as much as possible, thereby avoiding cross interference. Therefore, this design can support reliable transmission in more self-contained slot structures. Further, because the reliable transmission is supported, a retransmission probability can be reduced. Therefore, a latency of data transmission in the self-contained slot structure can be reduced.

In one embodiment, the resource position is mapped to four consecutive symbols in time domain; and the subcarrier spacing is 60 kHz, a set of indexes of the first symbol of the resource position is a sixth set or a subset of the sixth set, and indexes of a symbol included in the sixth set are $\{0, 7, 14, 21\}+28\times c$, where $c\geq0$ and c is an integer.

According to the method, downlink symbols in a slot may be the first several symbols in the slot, to ensure that a network side dynamically changes a quantity of uplink symbols and a quantity of downlink symbols according to an actual requirement. In a possible scenario, there may be at least three self-contained slots with a subcarrier spacing of 60 kHz within 0.5 ms, to ensure low-latency and high-reliability transmission of a service corresponding to the subcarrier spacing of 60 kHz, and to enable another terminal device to obtain the SSB to access a system.

In one embodiment, the PSS is mapped to the first symbol in the four consecutive symbols in time domain, the SSS is mapped to the third symbol in the four consecutive symbols in time domain, the PBCH is mapped to the second symbol, the third symbol, and the fourth symbol in the four consecutive symbols in time domain, and a quantity of resource blocks RBs to which the SSB is mapped in frequency domain is less than or equal to 20; and that the PSS, the SSS, and the PBCH are frequency-division multiplexed and time-division multiplexed in the resource position includes:

the PSS and the SSS are time-division multiplexed, and the PSS and the SSS are mapped, in a frequency, to subcarriers included in RBs numbered 5 to 16 in 20 RBs numbered 1 to 20; and when the PBCH is mapped to the second symbol or the fourth symbol in the four consecutive symbols in time domain, a quantity of RBs to which the PBCH is mapped in frequency domain is less than or equal to 20; or when the PBCH is mapped to the third symbol in the four consecutive symbols in time domain, the PBCH is mapped, in frequency domain, to subcarriers included in RBs numbered 1 to 4 and subcarriers included in RBs numbered 17 to 20 in the 20 RBs numbered 1 to 20.

According to the synchronization signal block transmission method provided in this embodiment, locations of the PBCH, the SSS, and the PSS in the SSB that occupies four consecutive symbols are adjusted in frequency domain and in time domain, to flexibly set a format of the SSB. According to the method, downlink symbols in a slot may be the first several symbols in the slot, to ensure that a network side dynamically changes a quantity of uplink symbols and a quantity of downlink symbols according to an actual requirement. In a possible scenario, there may be at least three self-contained slots with a subcarrier spacing of 60 kHz within 0.5 ms, to ensure low-latency and high-reliability transmission of a service corresponding to the subcarrier spacing of 60 kHz, and to enable another terminal device to obtain the SSB to access a system.

In one embodiment, the resource position occupies, in time domain, a total of four symbols including a first group of consecutive symbols and a second group of consecutive symbols, and the first group of consecutive symbols and the second group of consecutive symbols are separated by x symbols, where $x\geq1$ and x is an integer.

In one embodiment, the subcarrier spacing is 30 kHz, a set of indexes of the first symbol of the resource position is a seventh set or a subset of the seventh set, and symbols included in the seventh set are $\{0, 14\}+28\times b$, where $b\geq0$ and b is an integer.

In one embodiment, the subcarrier spacing is 60 kHz, a set of indexes of the first symbol of the resource position is an eighth set or a subset of the eighth set, and symbols included in the eighth set are $\{0, 2, 14, 16\}+28\times c$, where $c\geq0$ and c is an integer.

According to the method, downlink symbols in a slot may be the first several symbols in the slot, to ensure that a network side dynamically changes a quantity of uplink symbols and a quantity of downlink symbols according to an actual requirement. In a possible scenario, there may be at least three self-contained slots with a subcarrier spacing of 60 kHz within 0.5 ms, to ensure low-latency and high-reliability transmission of a service corresponding to the subcarrier spacing of 60 kHz, and to enable another terminal device to obtain the SSB to access a system.

In one embodiment, the PSS is mapped to the first symbol in the first group of consecutive symbols in time domain, the SSS is mapped to the first symbol in the second group of consecutive symbols in time domain, and the PBCH is mapped to the second symbol in the first group of consecutive symbols and the first symbol and the second symbol in the second group of consecutive symbols in time domain;

the SSS is mapped to the first symbol in the first group of consecutive symbols in time domain, the PSS is mapped to the first symbol in the second group of consecutive symbols in time domain, and the PBCH is mapped to the second symbol in the first group of consecutive symbols and the first symbol and the second symbol in the second group of consecutive symbols in time domain;

the PSS is mapped to the first symbol in the first group of consecutive symbols in time domain, the SSS is mapped to the first symbol in the second group of consecutive symbols in time domain, and the PBCH is mapped to the second symbol in the first group of consecutive symbols and the second symbol in the second group of consecutive symbols in time domain; or the SSS is mapped to the first symbol in the first group of consecutive symbols in time domain, the PSS is mapped to the first symbol in the second group of consecutive symbols in time domain, and the PBCH is mapped to the second symbol in the first group of consecutive symbols and the second symbol in the second group of consecutive symbols in time domain.

According to the synchronization signal block transmission method provided in this embodiment, locations of the PBCH, the SSS, and the PSS in the SSB that occupies four inconsecutive symbols are adjusted in frequency domain and in time domain, to flexibly set a format of the SSB.

In any one of the first aspect, the second aspect, the third aspect, or the embodiments of the first aspect, the second aspect, or the third aspect, after the synchronization signal block SSB sent by the network device in the resource position of the SSB is received, first indication information sent by the network device is further received, where the first indication information is used to indicate, to the terminal device, the resource position that is in the candidate resource position set and that is used to transmit the SSB.

In the method, the first indication information is used to indicate, to the terminal device, the resource position for transmitting the SSB, so that the terminal device does not detect, based on the first indication information, a PDCCH candidate time-frequency resource in the resource position for transmitting the SSB, or so that the terminal device performs, based on the first indication information, rate matching on a PDSCH on a resource for transmitting the SSB. This ensures that the resource for transmitting the SSB is not shared by another channel and that all terminals can access a system.

In one embodiment, the first indication information is further used to indicate a first candidate resource position set, the first candidate resource position set is a subset of the candidate resource position set, the candidate resource position set includes L resource positions, sequence numbers of the L resource positions are 1 to L in sequence, and the first candidate resource position set includes an odd-numbered resource position in the L resource positions, or the first candidate resource position set includes an even-numbered resource position in the L resource positions.

According to the synchronization signal block transmission method provided in this embodiment, when a plurality of subcarrier spacings that are sensitive to latency reliability coexist, the SSB occupies four consecutive symbols, the SSB is transmitted at the subcarrier spacing of 30 kHz, and data is transmitted at the subcarrier spacing of 60 kHz. In this case, for any two adjacent resource positions in the candidate resource position set, the network device sends the SSB in only one of the resource positions, so that the terminal device needs to perform blind detection on only one group of four consecutive symbols within 0.5 ms to receive the SSB, thereby reducing a quantity of times of blind detection of the terminal device, and reducing power consumption of the terminal device. In addition, there are three self-contained slots for the subcarrier spacing of 60 kHz within 0.5 ms, to ensure that another terminal device can obtain an SSB to access a system while ensuring data transmission reliability.

In one embodiment, the first indication information is further used to indicate a first candidate resource position set, the first candidate resource position set is a subset of a second candidate resource position set, and the second candidate resource position set is the candidate resource position set of the SSB, for example, a candidate resource position set predefined in a protocol.

According to the synchronization signal block transmission method provided in this embodiment, the candidate resource position set is a candidate resource position set unrelated to the candidate resource position set in the first aspect, the second aspect, or the third aspect. When a plurality of subcarrier spacings that are sensitive to latency reliability coexist, the first candidate resource position set is obtained based on the second candidate resource position set, where resource positions in the first candidate resource position set are a set including odd-numbered resource positions in the second candidate resource position set, or a set including even-numbered resource positions in the second candidate resource position set. In other words, the network device sends the SSB in only in one candidate resource position in any two adjacent resource positions in the second candidate resource position set, so that the terminal device performs blind detection in only one candidate resource position in the two adjacent candidate resource positions to receive the SSB. This reduces a quantity of times of blind detection of the terminal device, and reduces power consumption of the terminal device. In addition, a symbol to which the resource position of the SSB is mapped does not overlap with an uplink transmission symbol in a plurality of self-contained slot structures as much as possible, thereby avoiding cross interference. This ensures that another terminal device can obtain an SSB to access a system while ensuring data transmission reliability.

According to a fourth aspect, an embodiment of this application provides a synchronization signal block transmission method, including:

sending a synchronization signal block (SSB) to a terminal device in a resource position of the SSB, where the resource position of the SSB is included in a candidate resource position set of the SSB, and the SSB includes a primary synchronization signal (PSS), a secondary synchronization signal (SSS), and a physical broadcast channel (PBCH), where one resource position in the candidate resource position set is mapped to one symbol in time domain, the PSS, the SSS, and the PBCH are frequency-division multiplexed in the resource position, and a subcarrier spacing corresponding to the resource position is 15 kHz, 30 kHz, or 60 kHz.

For descriptions of the candidate resource position set, refer to the first aspect or any embodiment of the first aspect. Details are not described herein again.

According to a fifth aspect, an embodiment of this application provides a synchronization signal block transmission method, including:

sending a synchronization signal block (SSB) to a terminal device in a resource position of the SSB, where the resource position of the SSB is included in a candidate resource position set of the SSB, and the SSB includes a primary synchronization signal (PSS), a secondary synchronization signal (SSS), and a physical broadcast channel (PBCH), where one resource position in the candidate resource position set is mapped to two consecutive symbols in time domain, the PSS, the SSS, and the PBCH are frequency-division multiplexed and time-division multiplexed in the resource position, and a subcarrier spacing corresponding to the resource position is 30 kHz or 60 kHz.

For descriptions of the candidate resource position set, refer to the second aspect or any embodiment of the second aspect. Details are not described herein again.

According to a sixth aspect, an embodiment of this application provides a synchronization signal block transmission method, including:

sending a synchronization signal block (SSB) to a terminal device in a resource position of the SSB, where the resource position of the SSB is included in a candidate resource position set of the SSB, and the SSB includes a primary synchronization signal (PSS), a secondary synchronization signal (SSS), and a physical broadcast channel (PBCH), where one resource position in the candidate resource position set is mapped to four symbols in time domain, the PSS, the SSS, and the PBCH are frequency-division multiplexed and time-division multiplexed in the resource position, and a subcarrier spacing corresponding to the resource position is 30 kHz or 60 kHz.

For descriptions of the candidate resource position set, refer to the third aspect or any embodiment of the third aspect. Details are not described herein again.

A seventh aspect of the embodiments of this application provides a communications apparatus. The communications apparatus may be a terminal device, or may be an apparatus that can support a terminal device in performing a corresponding function performed by the terminal device in any design example of the first aspect to the third aspect. For example, the apparatus may be an apparatus in the terminal device or a chip system, the apparatus may include a receiving module, and the module may perform a corresponding function performed by the terminal device in any design example of the first aspect to the third aspect. An example is as follows:

The receiving module is configured to receive a synchronization signal block (SSB) sent by a network device in a resource position of the SSB, where the resource position of the SSB is included in a candidate resource position set of the SSB, and the SSB includes a primary synchronization signal (PSS), a secondary synchronization signal (SSS), and a physical broadcast channel (PBCH).

In one embodiment, for content of the candidate resource position set and the SSB, refer to descriptions of the candidate resource position set and the SSB in the first aspect to the third aspect. This is not limited herein.

In one embodiment, after receiving the synchronization signal block SSB sent by the network device in the resource position of the SSB, the receiving module is further configured to receive first indication information sent by the network device, where the first indication information is used to indicate, to the terminal device, the resource position that is in the candidate resource position set and that is used to transmit the SSB, or the first indication information is used to indicate, to the terminal device, a possible resource position that is in the candidate resource position set and that is used to transmit the SSB.

In one embodiment, the first indication information is further used to indicate a first candidate resource position set, the first candidate resource position set is a subset of the candidate resource position set, the candidate resource position set includes L resource positions, sequence numbers of the L resource positions are 1 to L in sequence, and the first candidate resource position set includes an odd-numbered resource position in the L resource positions, or the first candidate resource position set includes an even-numbered resource position in the L resource positions.

An eighth aspect of the embodiments of this application provides a communications apparatus. The communications apparatus may be a network device, or may be an apparatus that can support a network device in performing a corresponding function performed by the network device in any design example of the fourth aspect to the sixth aspect. For example, the apparatus may be an apparatus in the network device or a chip system, the apparatus may include a sending module, and the module may perform a corresponding function performed by the network device in any design example of the fourth aspect to the sixth aspect. An example is as follows:

The sending module is configured to send a synchronization signal block (SSB) to a terminal device in a resource position of the SSB, where the resource position of the SSB is included in a candidate resource position set of the SSB, and the SSB includes a primary synchronization signal (PSS), a secondary synchronization signal (SSS), and a physical broadcast channel (PBCH).

In one embodiment, for content of the candidate resource position set and the SSB, refer to descriptions of the candidate resource position and the SSB in the fourth aspect to the sixth aspect. This is not limited herein.

In one embodiment, after sending the synchronization signal block SSB to the terminal device in the resource position of the SSB, the sending module further sends first indication information to the terminal device, where the first indication information is used to indicate, to the terminal device, the resource position that is in the candidate resource position set and that is used to transmit the SSB.

In one embodiment, the first indication information is further used to indicate a first candidate resource position set, the first candidate resource position set is a subset of the candidate resource position set, the candidate resource position set includes L resource positions, sequence numbers of the L resource positions are 1 to L in sequence, and the first candidate resource position set includes an odd-numbered resource position in the L resource positions, or the first candidate resource position set includes an even-numbered resource position in the L resource positions.

According to a ninth aspect, an embodiment of this application provides a communications apparatus, including a processor, configured to implement functions of the terminal device in the methods described in the first aspect to the third aspect. The communications apparatus may further include a memory, configured to store a program instruction and data. The memory is coupled to the processor. The processor may invoke and execute the program instruction stored in the memory, to implement the functions of the terminal device in the methods described in the first aspect to the third aspect. The communications apparatus may further include a communications interface. The communications interface is used by the terminal device to communicate with another device. For example, the another device is a network device.

In a possible device, the terminal device includes:
a communications interface;
a memory, configured to store a program instruction; and
a processor, configured to: invoke the program instruction stored in the memory, and receive, through the communications interface, a synchronization signal block (SSB) sent by a network device in a resource position of the SSB.

In one embodiment, the processor is further configured to: invoke the program instruction stored in the memory, and receive, through the communications interface, first indication information sent by the network device.

In one embodiment, for content of the candidate resource position set and the SSB and descriptions of the first indication information, refer to corresponding descriptions in the first aspect to the third aspect. This is not limited herein.

According to a tenth aspect, an embodiment of this application provides a communications apparatus, including a processor, configured to implement functions of the network device in the methods described in the fourth aspect to the sixth aspect. The communications apparatus may further include a memory, configured to store a program instruction and data. The memory is coupled to the processor. The processor may invoke and execute the program instruction stored in the memory, to implement the functions of the network device in the methods described in the fourth aspect to the sixth aspect. The communications apparatus may further include a communications interface. The communications interface is used by the network device to communicate with another device. For example, the another device is a terminal device.

In a possible device, the network device includes:
a communications interface;
a memory, configured to store a program instruction; and
a processor, configured to: invoke the program instruction stored in the memory, and send a synchronization signal block (SSB) to a terminal device in a resource position of the SSB through the communications interface.

In one embodiment, the processor is further configured to: invoke the program instruction stored in the memory, and send first indication information to the terminal device through the communications interface.

In one embodiment, for content of the candidate resource position set and the SSB and descriptions of the first indication information, refer to corresponding descriptions in the fourth aspect to the sixth aspect. This is not limited herein.

An eleventh aspect of the embodiments of this application provides a chip system. The chip system includes a processor, may further include a memory, may further include a communications interface, and is configured to implement a function of the terminal device in the foregoing methods. The chip system may include a chip, or may include a chip and another discrete component.

A twelfth aspect of the embodiments of this application provides a chip system. The chip system includes a processor, may further include a memory, may further include a communications interface, and is configured to implement a function of the network device in the foregoing methods. The chip system may include a chip, or may include a chip and another discrete component.

A thirteenth aspect of the embodiments of this application provides a computer program product. The computer program product includes computer program code. When the computer program code is executed by a computer, the computer is enabled to perform the method according to any one of the first aspect to the third aspect, or the computer is enabled to perform the method according to any one of the fourth aspect to the sixth aspect.

A fourteenth aspect of the embodiments of this application provides a computer-readable storage medium. The computer storage medium stores a computer instruction. When the computer instruction is executed by a computer, the computer is enabled to perform the methods according to the first aspect to the third aspect or according to the fourth aspect to the sixth aspect.

A fifteenth aspect of the embodiments of this application provides a system. The system includes the communications apparatus according to the seventh aspect and the communications apparatus according to the eighth aspect, or the system includes the communications apparatus according to the ninth aspect and the communications apparatus according to the tenth aspect.

DESCRIPTION OF EMBODIMENTS

Figure 1:
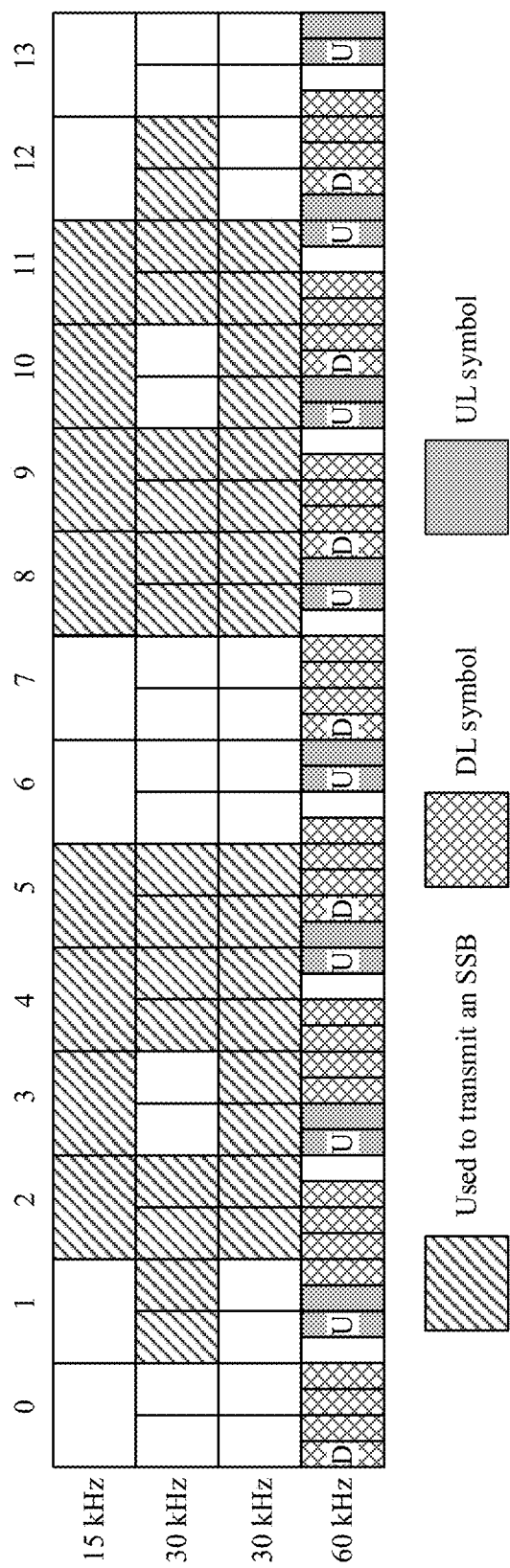
FIG. 1 is a schematic diagram of a symbol conflict when a plurality of subcarrier spacings coexist.

In a communications system, to ensure flexibility of data transmission, a self-contained structure is introduced in time domain. For example, a self-contained slot is introduced. A self-contained slot may include both a downlink (DL) symbol and an uplink (UL) symbol. The DL symbol is used for DL transmission, and the UL symbol is used for UL transmission. Further, the self-contained slot may further include a conversion symbol. For example, a conversion symbol may be included between the DL symbol and the UL symbol. The conversion symbol may also be referred to as a blank symbol or have another name, and is neither used for DL transmission nor used for UL transmission. A subcarrier spacing of 60 kHz is used as an example. One self-contained slot includes seven symbols or 14 symbols, or one self-contained slot includes another quantity of symbols. This is not limited in this application. A self-contained slot including seven symbols is used as an example. The seven symbols include a DL symbol, a conversion symbol, and a UL symbol. For example, in the seven symbols, the first four symbols are DL symbols, the fifth symbol is a conversion symbol, and the sixth and the seventh symbols are UL symbols. For another example, in the seven symbols, the first five symbols are DL symbols, the sixth symbol is a conversion symbol, and the seventh symbol is a UL symbol.

In the embodiments of this application, the symbol may be an OFDM symbol, a single-carrier frequency division multiple access (SC-FDMA) symbol, or another time domain symbol. This is not limited in this application. The OFDM symbol may be used as an example for description in the embodiments of this application.

In the embodiments of this application, the self-contained structure may be further extended to another time domain unit, for example, a self-contained subframe structure. This is not limited in this application. For example, a self-contained subframe may include both a DL symbol and a UL symbol. Further, the self-contained subframe may further include a conversion symbol. For example, a conversion symbol may be included between the DL symbol and the UL symbol.

When a plurality of subcarrier spacings coexist, to avoid cross interference between an uplink and a downlink, overlapping between a downlink transmission part of one subcarrier spacing and an uplink transmission part of another subcarrier spacing in time domain needs to avoided. Therefore, when a plurality of subcarriers spacings coexist, and when an SSB is transmitted at a relatively small subcarrier spacing, and data is transmitted by using a self-contained slot structure with a relatively large subcarrier spacing, overlapping between the SSB with the relatively small subcarrier spacing and an uplink part in the self-contained slot structure with the relatively large subcarrier spacing in time domain needs to be avoided, to avoid the cross interference between the uplink and the downlink. For example, FIG. 1 is a schematic diagram of a symbol conflict when a plurality of subcarrier spacings coexist.

Referring to FIG. 1, a slot corresponding to a subcarrier spacing of 60 kHz is a self-contained slot. Each self-contained slot includes seven symbols in time domain (which may also be referred to as occupying seven symbols in time domain, or may be referred to as mapping seven symbols in time domain). In each self-contained slot, the first four symbols are used for DL transmission, the fifth symbol is a conversion symbol, and the sixth and the seventh symbols are UL symbols. For the subcarrier spacing of 60 kHz, 1 ms includes a total of eight self-contained slot structures: the first to the eighth self-contained slot structures.

When an SSB is transmitted at a subcarrier spacing of 15 kHz, within 1 ms, in particular, within duration of the $0^{th}$ symbol to the $13^{th}$ symbol with 15 kHz in time domain, a resource position of the SSB may be symbols 2 to 5 or symbols 8 to 11. For example, when the symbols 2 to 5 for the subcarrier spacing of 15 kHz are used transmit the SSB, the self-contained structure with 60 kHz shown in FIG. 1 is used for data transmission on another frequency domain resource. In this case, the SSB with 15 kHz overlaps or conflicts with, in time domain, UL transmission parts in the second and the third self-contained slot structures with 60 kHz, generating uplink and downlink cross interference and affecting uplink reception.

When an SSB is transmitted at a subcarrier spacing of 30 kHz, when a first configuration mode is used, there are four candidate resource positions of the SSB within 1 ms: symbols 2 to 5, symbols 8 to 11, symbols 16 to 19, and symbols 22 to 25. For example, the SSB is transmitted on the symbols 2 to 5 of the subcarrier spacing of 30 kHz, and the self-contained slot with the 60 kHz subcarrier is used for data transmission. In this case, the symbols 2 to 5 of the subcarrier spacing of 30 kHz that are used for SSB transmission overlap or conflict with, in time domain, a UL transmission part in the first self-contained slot structure with 60 kHz, generating uplink and downlink cross interference, affecting uplink reception. When a second configuration mode is used, there are four candidate resource positions of the SSB within 1 ms, including symbols 4 to 7, symbols 8 to 11, symbols 16 to 19, and symbols 20 to 23. For example, the SSB is transmitted on the symbols 16 to 19, and the self-contained slot with the subcarrier spacing of 60 kHz is used for data transmission. In this case, the symbols 16 to 19 with 30 kHz that are used to transmit the SSB overlap or conflict with, in time domain, a UL transmission part in the fifth self-contained slot structure with 60 kHz, generating uplink and downlink cross interference, and affecting uplink reception. In conclusion, in the two manners of configuring the resource position of the SSB by using the subcarrier spacing of 30 kHz, some symbols used to transmit the SSB conflict with UL symbols in a self-contained slot used to transmit data by using the subcarrier spacing of 60 kHz.

Therefore, when a plurality of subcarriers coexist, how to ensure that another terminal device can obtain an SSB to access a system while ensuring data transmission reliability is a problem that needs to be urgently resolved in the industry.

In view of this, the embodiments of this application provide a synchronization signal block transmission method and a communications apparatus, to ensure that another terminal device can obtain an SSB to access a system while ensuring data transmission reliability.

The synchronization signal block transmission method provided in the embodiments of this application may be applied to a 4th generation (4G) mobile communications system (for example, a long term evolution (LTE) system, a long term evolution-advanced (LTE-A) system), a cellular system related to a 3rd generation partnership project (3GPP), a 5th generation (5G) mobile communications system and a subsequent evolved communications system. 5G may also be referred to as new radio (NR).

The network device in the embodiments of this application may be a base station such as a macro base station or a micro base station, and is a device that is deployed in a radio access network and that can perform wireless communication with a terminal device. The base station may be configured to mutually convert a received over-the-air frame and an internet protocol (IP) packet and serve as a router between the terminal device and a remaining part of an access network, where the remaining part of the access network may include an IP network. The base station may further coordinate attribute management of an air interface. For example, the base station may be an evolved NodeB (eNB or e-NodeB) in LTE, or may be a gNB in NR. The base station may also be a radio controller in a cloud radio access network (CRAN) scenario, or may be a relay station, an access point, a vehicle-mounted device, a wearable device, a network device in a future evolved public land mobile network (PLMN), or the like. This is not limited in the embodiments of this application.

The terminal device in the embodiments of this application may be a device that provides a user with voice and/or data connectivity, a handheld device with a wireless connection function, or another processing device connected to a wireless modem. The terminal device may communicate with one or more core networks through a radio access network (RAN). The terminal device may be a mobile terminal device, such as a mobile phone (also referred to as a "cellular" phone) or a computer with a mobile terminal device, for example, may be a portable, pocket-sized, handheld, computer built-in, or vehicle-mounted mobile apparatus. They exchange a voice and/or data with the radio access network. The terminal device may be a personal communications service (PCS) phone, a cordless phone, a session initiation protocol (SIP) phone, a wireless local loop (WLL) station, a personal digital assistant (PDA), a handheld device or a computing device with a wireless communication function, another processing device connected to a wireless modem, a vehicle-mounted device, a wearable device, a terminal in a 5G network, a terminal device in a future evolved public land mobile network (PLMN), or the like. This is not limited in the embodiments of this application. The terminal device may also be referred to as a system, a subscriber unit, a subscriber station, a mobile station, a mobile, a remote station, an access point, a remote terminal device, an access terminal device, a user terminal device, a user agent, a user device, or user equipment.

Figure 2:
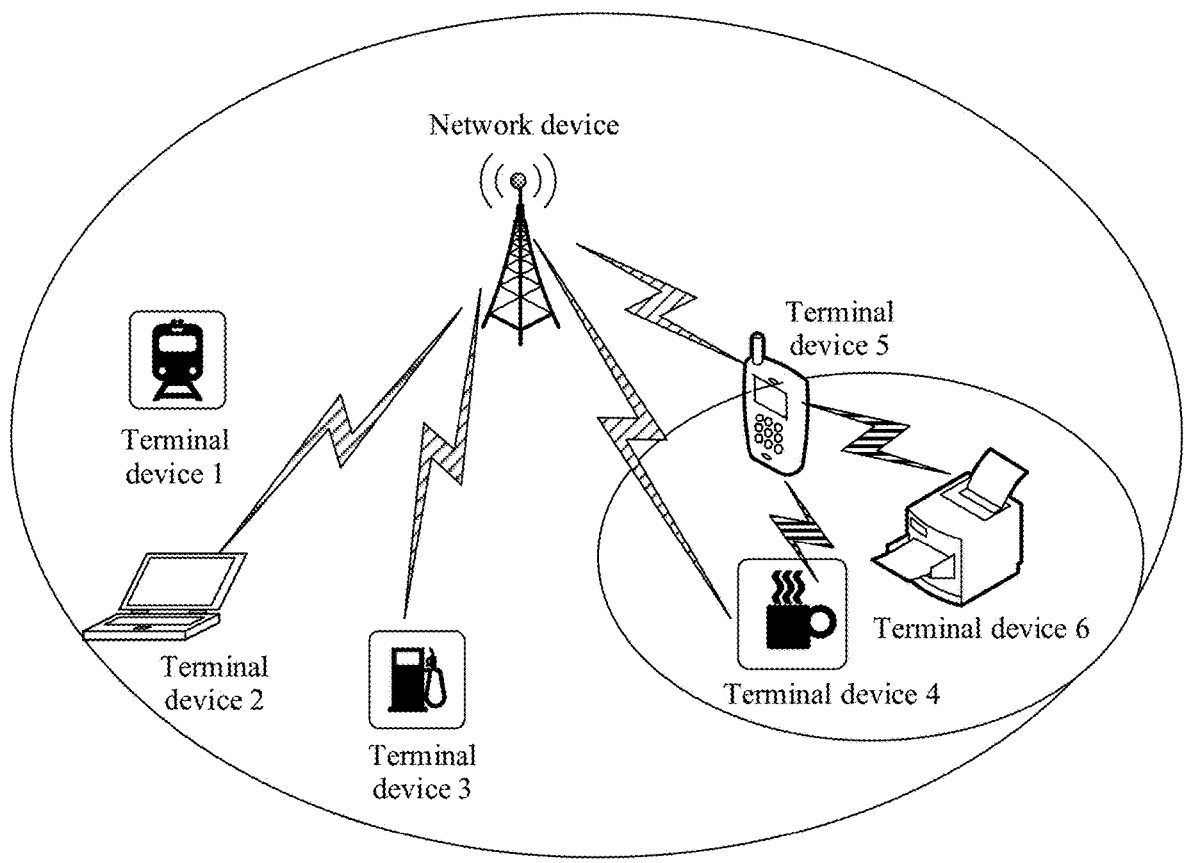
FIG. 2 is a schematic diagram of a scenario to which a synchronization signal block transmission method is applicable according to an embodiment of this application.

For example, FIG. 2 is a schematic diagram of a scenario to which a synchronization signal block transmission method is applicable according to an embodiment of this application. Referring to FIG. 2, a network device and a terminal device 1 to a terminal device 6 form a communications system. In the communications system, the network device sends an SSB to any terminal device in the terminal device 1 to the terminal device 6. In addition, the terminal device 4 to the terminal device 6 may also form a communications system. In the communications system, the terminal device 5 sends an SSB to the terminal device 4 or the terminal device 6.

The following describes in detail the synchronization signal block transmission method in this application.

Embodiment 1

Figure 3:
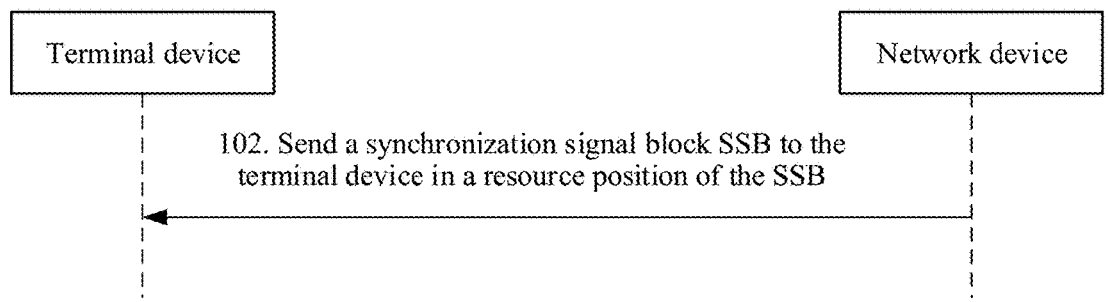
FIG. 3 is a flowchart of a synchronization signal block transmission method according to an embodiment of this application.

FIG. 3 is a schematic flowchart of a synchronization signal block transmission method according to an embodiment of this application. In this embodiment, the synchronization signal block transmission method in this application is described from a perspective of interaction between a network device and a terminal. In this embodiment, a resource position used to send an SSB is mapped to one symbol in time domain. In this embodiment of this application, unless otherwise specified below, that the resource position is mapped to one symbol in time domain may also be understood as that the resource position occupies one symbol in time domain, in other words, the SSB occupies one symbol in time domain; and may also be understood that the resource position includes one symbol in time domain. This embodiment includes the following operations.

101. The network device sends a synchronization signal block (SSB) to the terminal device in a resource position of the SSB.

The resource position of the SSB is included in a candidate resource position set of the SSB, and the SSB includes a primary synchronization signal (PSS), a secondary synchronization signal (SSS), and a physical broadcast channel (PBCH). One resource position in the candidate resource position set is mapped to one symbol in time domain, the PSS, the SSS, and the PBCH are frequency-division multiplexed in the resource position or the symbol, and a subcarrier spacing corresponding to the resource position is 15 kHz, 30 kHz, or 60 kHz.

In the embodiments of this application, for example, Embodiment 1, Embodiment 2, and Embodiment 3, the candidate resource position set includes one or more (candidate) resource positions, and a resource in each resource position is a candidate resource used by the network device to send the SSB to the terminal device. One resource position is mapped to one symbol, two symbols, four symbols, or the like in time domain. Therefore, when a candidate resource position of an SSB is designed, a time domain length of the resource position of the SSB is reduced, so that a symbol to which the resource position of the SSB is mapped does not overlap with uplink transmission symbols in a plurality of self-contained slot structures as much as possible, thereby avoiding cross interference. Therefore, this design can support reliable transmission in more self-contained slot structures. Further, because the reliable transmission is supported, a retransmission probability can be reduced. Therefore, a latency of data transmission in the self-contained slot structure can be reduced.

For example, in time domain, a symbol length of one symbol for a subcarrier spacing of 15 kHz is equal to a sum of symbol lengths of four symbols for a subcarrier spacing of 60 kHz. To avoid cross interference, overlapping between an SSB with the subcarrier spacing of 15 kHz and an uplink transmission part in a self-contained slot with the subcarrier spacing of 60 kHz in time domain needs to be avoided.

For another example, in time domain, a length of one symbol for a subcarrier spacing of 30 kHz is equal to a sum of symbol lengths of two symbols for a subcarrier spacing of 60 kHz. To avoid cross interference, overlapping, in time domain, between one symbol occupied by an SSB with the subcarrier spacing of 30 kHz and a symbol that is used for uplink transmission and that is in a self-contained slot with a subcarrier spacing of 60 kHz needs to be avoided.

For still another example, in time domain, when both an SSB and data are transmitted at a subcarrier spacing of 60 kHz in time domain, one self-contained slot with the subcarrier spacing of 60 kHz includes seven symbols. To avoid cross interference, overlapping, in time domain, between a symbol occupied by the SSB with the 60 kHz subcarrier spacing and a symbol that is used for uplink transmission and that is in a self-contained slot with the subcarrier spacing of 60 kHz needs to be avoided, to be particular, overlapping, in time domain, between the resource position of the SSB and a position of the symbol used for uplink transmission in the self-contained slot needs to be avoided.

In operation 101, when sending the SSB to the terminal device, the network device maps the SSB to one resource position for sending, where the resource position is mapped to one symbol in time domain. This may also be understood that the SSB occupies one symbol. Correspondingly, the terminal device blindly detects the SSB in the candidate resource position of the SSB. In a blind detection process, the terminal device searches for an SSB by grid in frequency domain, obtains an index of the SSB based on a demodulation reference signal (DMRS) of the SSB or based on a physical broadcast channel (PBCH) in time domain, and obtains time domain information of the blindly detected SSB based on the index of the SSB.

According to the synchronization signal block transmission method provided in this embodiment of this application, the network device sends the SSB to the terminal device in the resource position of the SSB. Correspondingly, the terminal device receives the SSB. In this process, because the resource position used to send the SSB is mapped to one symbol, two symbols, or four symbols in time domain, In this design, overlapping, in time domain, between a symbol occupied by the SSB and an uplink transmission symbol in a plurality of self-contained slot structures can be avoided as much as possible. Therefore, according to the method, reliability of data transmission in as many self-contained slot structures as possible can be ensured, and in addition, that another terminal device can obtain an SSB to access a system can be ensured. Further, because the reliable transmission is supported, a retransmission probability can be reduced. Therefore, a latency of data transmission in the self-contained slot structure can be reduced.

In the foregoing embodiment, the SSB is mapped to one symbol in time domain, that is, the SSB occupies one symbol in time domain, and a quantity of resource blocks (RBs) to which the SSB is mapped in frequency domain is less than or equal to 72, where the PSS and the SSS each are mapped to 12 RBs in frequency domain, and a quantity of RBs to which the PBCH is mapped in frequency domain is less than or equal to 48. The following describes a structure of the SSB in the foregoing embodiment. For example, refer to FIG. 4.

Figure 4:
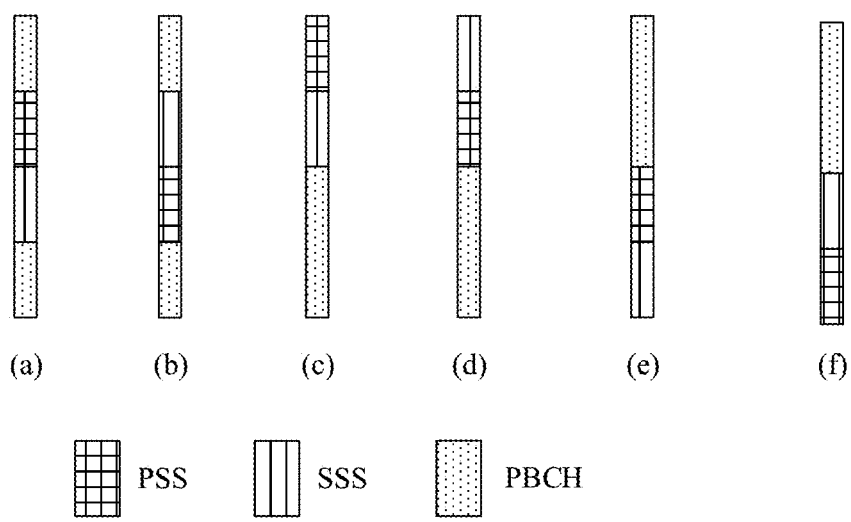
FIG. 4 is a schematic structural diagram of an SSB according to an embodiment of this application.

FIG. 4 is a schematic diagram of a structure of the SSB to which the synchronization signal block transmission method is applicable according to an embodiment of this application. Referring to FIG. 4, the SSB that occupies one symbol in time domain may be configured in the following formats:

In one embodiment, as shown in (a) in FIG. 4, the PSS, the SSS, and the PBCH in the SSB are frequency-division multiplexed (FDM), and use an RB as a unit in frequency domain. In this case, the PBCH, the SSS, the PSS, and the PBCH are arranged in sequence from bottom to top. The SSS and the PSS each are mapped to 12 RBs in frequency domain, the PBCH includes a first part and a second part, and quantities of RBs to which the first part and the second part each are mapped in frequency domain are less than or equal to 24. For example, assuming that a start number of RBs of the SSB is RB0, sequence numbers of RBs of the first part of the PBCH are RB0 to RB23, sequence numbers of RBs of the SSS are RB24 to RB35, sequence numbers of RBs of the PSS are RB36 to RB47, and sequence numbers of RBs of the second part of the PBCH are RB48 to RB71.

In one embodiment, as shown in (b) in FIG. 4, a difference between this design and that in (a) in FIG. 4 lies in that locations of the SSS and the PSS are exchanged.

In one embodiment, as shown in (c) in FIG. 4, the PSS, the SSS, and the PBCH in the SSB are FDMed, and use an RB as a unit in frequency domain. In this case, the PBCH, the SSS, and the PSS are arranged in sequence from bottom to top. The SSS and the PSS each are mapped to 12 RBs in frequency domain, and a quantity of RBs of the PBCH in frequency domain is less than or equal to 48. For example, assuming that a start number of RBs of the SSB is RB0, sequence numbers of RBs of the PBCH are RB0 to RB47, sequence numbers of RBs of the SSS are RB48 to RB59, and sequence numbers of RBs of the PSS are RB60 to RB71.

In one embodiment, as shown in (d) in FIG. 4, a difference between this design and that in (c) in FIG. 4 lies in that locations of the SSS and the PSS are exchanged.

In one embodiment, as shown in (e) in FIG. 4, the PSS, the SSS, and the PBCH in the SSB are FDMed, and use an RB as a unit in frequency domain. In this case, the SSS, the PSS, and the PBCH are arranged in sequence from bottom to top. The SSS and the PSS each are mapped to 12 RBs in frequency domain, and a quantity of RBs of the PBCH in frequency domain is less than or equal to 48. For example, assuming that a start number of RBs of the SSB is RB0, sequence numbers of RBs of the SSS are RB0 to RB11, sequence numbers of RBs of the PSS are RB12 to RB23, and sequence numbers of RBs of the PBCH are RB24 to RB71.

In one embodiment, as shown in (f) in FIG. 4, a difference between this design and that in (e) in FIG. 4 lies in that locations of the SSS and the PSS are exchanged.

It should be noted that, although in the SSB formats shown in (a) to (f) in FIG. 4, the SSS and the PSS each are mapped to all subcarriers of the 12 RBs, this embodiment of this application is not limited thereto. In another embodiment, the SSS and the PSS each may alternatively be mapped to some subcarriers of the 12 RBs. Using (e) in FIG. 4 and the SSS as an example, the SSS is mapped to some subcarriers of the 12 RBs, for example, mapped to 127 subcarriers in the middle of 144 subcarriers of the 12 RBs.

In the embodiments of this application, for example, Embodiment 1, Embodiment 2, or Embodiment 3, a quantity of RBs or subcarriers included in the PBCH, each component of the PBCH, the PSS, or the SSS may be a positive integer. The positive integer may be 1, 2, 3, or a larger value. This is not limited in this application.

In addition, it should be further noted that in (a) to (f) in FIG. 4 or other accompanying drawings in the embodiments of this application, "from bottom to top" may be a direction of extension in frequency domain or a direction of a frequency increase starting from a start RB (for example, an RB numbered 0) when an RB is used as a unit in frequency domain.

In this embodiment, locations of the PBCH, the SSS, and the PSS in the SSB that occupies one symbol are adjusted in frequency domain, to flexibly set a format of the SSB.

The following describes in detail the candidate resource position set in the foregoing embodiment for each subcarrier spacing.

In one embodiment, when the subcarrier spacing is 15 kHz, the candidate resource position set is a first set or a subset of the first set, and indexes of a symbol in the first set are $\{0, 7, 14, 21\}+28\times a$, where $a\geq 0$ and a is an integer.

For example, a value of a is related to a length of an SSB window. For example, when the length of the SSB window is 5 ms, a is equal to 0 or 1. When the length of the SSB window is 10 ms, a is equal to 0, 1, 2, 3, or 4. For the subcarrier spacing of 15 kHz, 2 ms includes 28 symbols, and indexes of the 28 symbols are sequentially 0 to 27. Using 2 ms as an example of a period, the indexes of the symbol in the first set are $\{0, 7, 14, 21\}+28\times a$, where a represents the period. In this embodiment of this application, the candidate resource position of the SSB may be determined at a granularity of a period. The SSB window may include one or more periods, and in the SSB window the candidate resource position of the SSB may be determined at a granularity of a period. That the first set includes one period is used as an example. In one embodiment, when a=0, the indexes of the symbol in the first set are $\{0, 7, 14, 21\}$. In this case, indexes of a symbol that are included in the candidate resource position set are $\{0, 7, 14, 21\}$, or a subset of the first set, for example, $\{0, 7\}$ and $\{0, 21\}$.

It should be noted that although the foregoing describes the first set by using the example in which the period is 2 ms, this is not limited in this embodiment of this application. For example, one period may alternatively be 1 ms. In this case, the indexes of the symbol in the first set are $\{0, 7\}+14\times a$, where $a\geq 0$ and a is an integer. In this case, if the length of the SSB window is 5 ms, a is equal to 0, 1, 2, 3, or 4. If the length of the SSB window is 10 ms, a is an integer less than or equal to 9.

In one embodiment, when the subcarrier spacing is 30 kHz, the candidate resource position set is a second set or a subset of the second set, and indexes of a symbol in the second set are $\{0, 1, 7, 8, 14, 15, 21, 22\}+28\times b$.

For example, a value of b is related to a length of an SSB window. When the length of the SSB window is 5 ms, b is equal to 0, 1, 2, 3, or 4. When the length of the SSB window is 10 ms, b is equal to any one of 0 to 9. For the subcarrier spacing of 30 kHz, 1 ms includes 28 symbols, and indexes of the 28 symbols are sequentially 0 to 27. Using 1 ms as an example of a period, the indexes of the symbol in the second set are $\{0, 1, 7, 8, 14, 15, 21, 22\}+28\times b$. That the second set includes one period is used as an example. In one embodiment, when b=0, the indexes of the symbol in the second set are $\{0, 1, 7, 8, 14, 15, 21, 22\}$. In this case, indexes of a symbol that are included in the candidate resource position set are $\{0, 1, 7, 8, 14, 15, 21, 22\}$, or a subset of the second set, for example, $\{14, 15, 21\}$ or $\{0, 1, 7, 8, 14\}$.

In one embodiment, when the subcarrier spacing is 60 kHz, the candidate resource position set is a third set or a subset of the third set, and indexes of a symbol in the third set are $\{0, 1, 2, 3, 7, 8, 9, 10, 14, 15, 16, 17, 21, 22, 23, 24\}+28\times c$, where $c\geq 0$ and c is an integer.

For example, a value of c is related to a length of an SSB window. When the length of the SSB window is 5 ms, b is equal to any one of 0 to 9. When the length of the SSB window is 10 ms, b is equal to any one of 0 to 19. For the subcarrier spacing of 60 kHz, 0.5 ms includes 28 symbols, and indexes of the 28 symbols are sequentially 0 to 27. Using 0.5 ms as an example of a period, the indexes of the symbol in the third set are $\{0, 1, 2, 3, 7, 8, 9, 10, 14, 15, 16, 17, 21, 22, 23, 24\}+28\times c$, where c represents the period. That the third set includes one period is used as an example. In one embodiment, when c=0, the indexes of the symbol in the third set are $\{0, 1, 2, 3, 7, 8, 9, 10, 14, 15, 16, 17, 21, 22, 23, 24}. In this case, indexes of a symbol that are included in the candidate resource position set are {0, 1, 2, 3, 7, 8, 9, 10, 14, 15, 16, 17, 21, 22, 23, 24}, or a subset of the third set, for example, {0, 1, 2, 3, 7, 8, 9, 10} and {14, 15, 16}.

The following uses an example in which the self-contained slot with the subcarrier spacing of 60 kHz is used to transmit data, and in a structure of the self-contained slot, first four symbols are used for DL transmission, the fifth symbol is a conversion symbol, and the sixth symbol and the seventh symbol are UL symbols, to describe the synchronization signal block transmission method in detail. For example, refer to FIG. 5.

Figure 5:
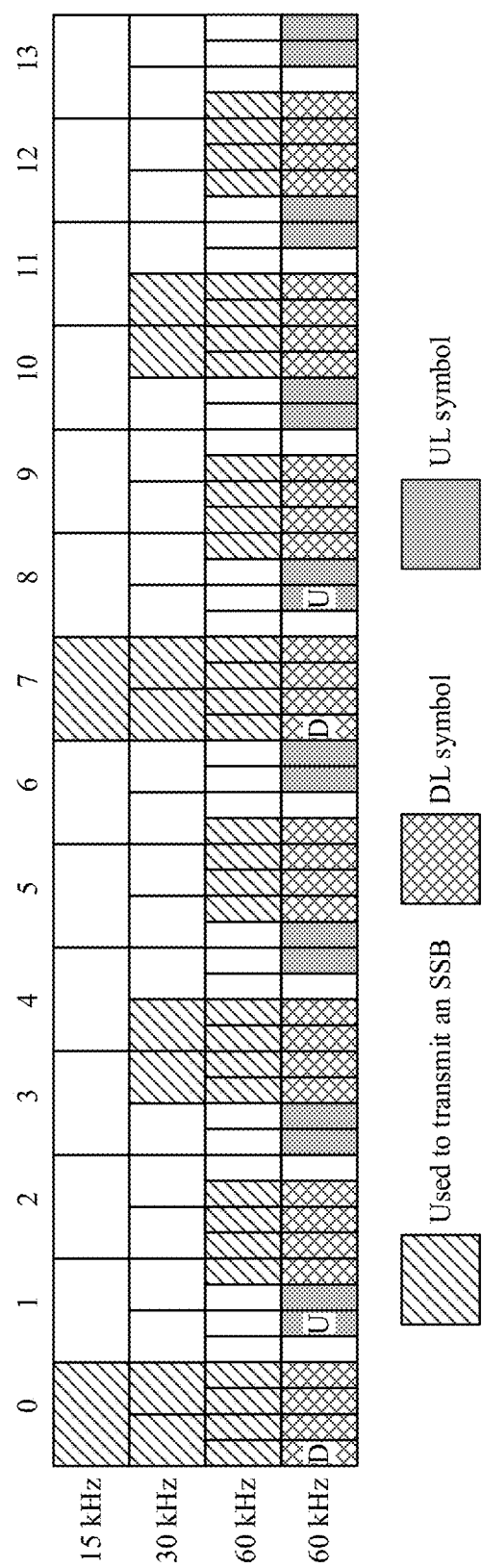
FIG. 5 is a schematic diagram of an example of a synchronization signal block transmission method according to an embodiment of this application.

FIG. 5 is a schematic diagram of an example of the synchronization signal block transmission method according to an embodiment of this application. As shown in FIG. 5:

When the SSB is transmitted at the subcarrier spacing of 15 kHz, the indexes of the symbol in the first set are {0, 7, 14, 21}+28×a; when a=0, the indexes of the symbol that are included in the first set are {0, 7, 14, 21} within 2 ms. In this case, a possible resource position of the SSB includes a symbol 0 and a symbol 7, a symbol 0, a symbol 7, or another subset of {0, 7, 14, 21}.

When the SSB is transmitted at the subcarrier spacing of 30 kHz, the indexes of the symbol in the second set are {0, 1, 7, 8, 14, 15, 21, 22}+28×b, and the indexes of the symbol that are included in the second set are {0, 1, 7, 8, 14, 15, 21, 22} within 1 ms. In this case, a possible resource position of the SSB is {0, 1, 7, 8, 14, 15, 21, 22} or a subset of the second set.

When the SSB is transmitted at the subcarrier spacing of 60 kHz, the indexes of the symbol in the third set are {0, 1, 2, 3, 7, 8, 9, 10, 14, 15, 16, 17, 21, 22, 23, 24}+28×c, and the indexes of the symbol that are included in the third set are {0, 1, 2, 3, 7, 8, 9, 10, 14, 15, 16, 17, 21, 22, 23, 24} within 0.5 ms. In this case, a possible resource position of the SSB is {0, 1, 2, 3, 7, 8, 9, 10, 14, 15, 16, 17, 21, 22, 23, 24} or a subset of the third set.

In this embodiment, the SSB occupies one symbol. The candidate resource position sets of the SSB with the subcarrier spacings of 15 kHz, 30 kHz, and 60 kHz are set, so that one symbol to which the resource position of the SSB is mapped does not overlap with uplink transmission symbols in a plurality of self-contained slot structures as much as possible. A probability that a symbol to which the resource position of the SSB is mapped conflicts with an uplink symbol is reduced to avoid cross interference, so that at least three types of self-contained slots with the subcarrier spacing of 60 kHz exist within 0.5 ms, thereby ensuring reliable transmission of a service corresponding to the subcarrier spacing of 60 kHz, and enabling another terminal device to obtain an SSB to can access a system.

It should be noted that, although in the foregoing embodiment, the self-contained slot with the subcarrier spacing of 60 kHz includes seven symbols, and in the seven symbols, the first four symbols are used for DL transmission, the fifth symbol is a conversion symbol, and the sixth symbol and the seventh symbol are UL symbols, this is not limited in this embodiment of this application. In another embodiment, the self-contained slot structure may alternatively be another structure. For example, the first three symbols are DL symbols, the fourth to the sixth symbols are conversion symbols, and the seventh symbol is a UL symbol. For another example, the self-contained slot with the subcarrier spacing of 60 kHz includes 14 symbols.

In the foregoing embodiment, after receiving the synchronization signal block SSB sent by the network device in the resource position of the SSB, the terminal device further receives first indication information sent by the network device. The first indication information is used to indicate, to the terminal device, the resource position that is in the candidate resource position set and that is used to transmit the SSB, or the first indication information is used to indicate, to the terminal device, a possible resource position that is in the candidate resource position set and that is used to transmit the SSB.

For example, after sending the SSB to the terminal device in the resource position of the SSB, the network device further sends the first indication information to the terminal device. Correspondingly, after receiving the SSB in the resource position of the SSB, the terminal device further receives the first indication information sent by the network device. The first indication information is used to indicate the resource position that is in the candidate resource position set and that is used to transmit the SSB. For example, when the SSB is transmitted at the subcarrier spacing of 15 kHz, the indexes of the symbol in the first set are {0, 7, 14, 21}+28×a. When a=0, the indexes of the symbol that are included in the first set are {0, 7, 14, 21} within 2 ms. In this case, if the first indication information is used to indicate that a resource position set that may be used to transmit the SSB is the symbol 7, after receiving the first indication information, the terminal device determines that the SSB occupies the symbol 7. If the first indication information is used to indicate that a resource position set that may be used to transmit the SSB is the symbol 7 and the symbol 14, after receiving the first indication information, the terminal device determines that the SSB may occupy the symbol 7 and the symbol 14.

In one embodiment, the terminal device determines, based on the first indication information, the resource position for transmitting the SSB. When the terminal device subsequently receives a downlink channel, if a time-frequency resource of the downlink channel overlaps with a resource for transmitting the SSB, the terminal device does not receive the downlink channel on the overlapped time-frequency resource. For example, when the terminal determines, based on the first indication information, that the SSB occupies the symbol 7, and a downlink channel subsequently received by the terminal is a physical downlink shared channel (PDSCH), if a time-frequency resource occupied by the PDSCH partially overlaps with a time-frequency resource on which the symbol 7 is located, the terminal device performs rate matching around an overlapped time-frequency resource. For example, the PDSCH is transmitted at the subcarrier spacing of 30 kHz, and a 40-bit PDSCH needs to be mapped to 40 RBs of the symbol 7. If 20 RBs overlap with the resource for transmitting the SSB, the terminal device performs rate matching on the remaining 20 RBs to receive the 40-bit PDSCH. For another example, if the 40 RBs overlap with the resource for transmitting the SSB, the terminal device stops receiving the PDSCH. When a downlink channel is a physical downlink control channel (PDCCH), if a candidate time-frequency resource of the PDCCH partially overlaps with a time-frequency resource on which the symbol 7 is located, that is, one or more resource elements (RE) in the candidate time-frequency resource of the PDCCH overlap with the time-frequency resource occupied by the SSB, the terminal device does not detect the PDCCH on the candidate time-frequency resource of the PDCCH.

In this embodiment, the first indication information is used to indicate, to the terminal device, the resource position for transmitting the SSB, so that the terminal device does not detect, based on the first indication information, a PDCCH in the resource position for transmitting the SSB, or so that the terminal device performs, based on the first indication information, rate matching on a PDSCH on a resource for transmitting the SSB. This ensures that the resource for transmitting the SSB does not conflict with another channel and that all terminals can access a system.

Embodiment 2

Compared with Embodiment 1 in which the SSB is mapped to one symbol in time domain, in this embodiment, a resource position used to send an SSB is mapped to two symbols in time domain. In this embodiment of this application, unless otherwise specified below, that the resource position is mapped to two symbols in time domain may also be understood as that the resource position occupies two symbols in time domain, in other words, the SSB occupies two symbols in time domain, or that the resource position includes two symbols in time domain. In this embodiment, when sending an SSB to a terminal device, a network device maps the SSB to one resource position in a candidate resource position set of the SSB for sending. The resource position is mapped to two symbols in time domain. This may also be understood that the SSB occupies two symbols. Correspondingly, the terminal device blindly detects the SSB in the candidate resource position of the SSB. The SSB includes a primary synchronization signal (PSS), a secondary synchronization signal (SSS), and a physical broadcast channel (PBCH). One resource position in the candidate resource position set is mapped to two consecutive symbols in time domain, the PSS, the SSS, and the PBCH are frequency-division multiplexed and time-division multiplexed in the resource position, and a subcarrier spacing corresponding to the resource position is 30 kHz or 60 kHz.

For example, in time domain, a length of one symbol for a subcarrier spacing of 30 kHz is equal to a sum of lengths of two symbols for a subcarrier spacing of 60 kHz. To avoid cross interference, overlapping, in time domain, between two symbols occupied by an SSB with the subcarrier spacing of 30 kHz and a symbol that is used for uplink transmission and that is in a self-contained slot with the subcarrier spacing of 60 kHz needs to be avoided.

For another example, in time domain, both an SSB and data are transmitted at a subcarrier spacing of 60 kHz. To avoid cross interference, overlapping, in time domain, between two symbols occupied by an SSB with a subcarrier spacing of 60 kHz and a symbol that is used for uplink transmission and that is in a self-contained slot with the subcarrier spacing of 60 kHz needs to be avoided, to be particular, overlapping, in time domain, between the resource position of the SSB and a position of the symbol used for uplink transmission in the self-contained slot needs to be avoided.

In the foregoing embodiment, the SSB is mapped to two symbols in time domain, that is, occupies two symbols in time domain, the PSS, the SSS, and the PBCH in the SSB are frequency-division multiplexed and time-division multiplexed in one resource position, and a quantity of resource blocks RBs to which the SSB is mapped in frequency domain is less than or equal to 36. The following describes a structure of the SSB in the foregoing embodiment. For example, refer to FIG. 6.

Figure 6:
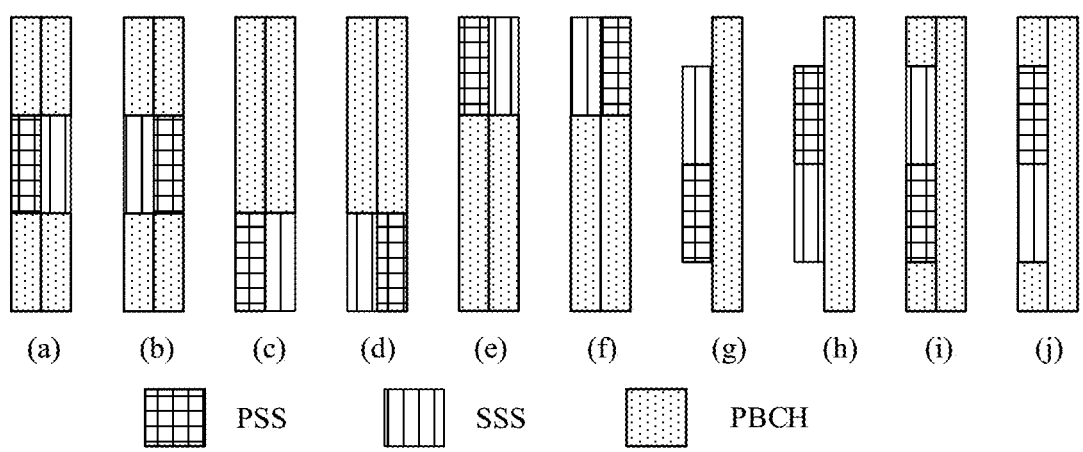
FIG. 6 is a schematic structural diagram of an SSB according to an embodiment of this application.

FIG. 6 is a schematic structural diagram of an SSB in a synchronization signal block transmission method according to another embodiment of this application. Refer to FIG. 6. The SSB that occupies two symbols in time domain may be configured in the following formats:

In one embodiment, the PSS and the SSS are time-division multiplexed, the PSS and the SSS are mapped to 12 same RBs in frequency domain, the PBCH and the PSS are frequency-division multiplexed, and a quantity of RBs to which the PBCH is mapped in frequency domain is less than or equal to 24.

For example, as shown in (a) in FIG. 6, the SSS and the PSS are time-division multiplexed (TDM), and are mapped to 12 same RBs in frequency domain, and the PBCH includes four parts: a first part, a second part, a third part, and a fourth part. The first part and the second part are time-division multiplexed, and the third part and the fourth part are time-division multiplexed. The first part and the second part form a first entirety, the PSS and the SSS form a second entirety, and the third part and the fourth part form a third entirety. The first entirety, the second entirety, and the third entirety are frequency-division multiplexed, and use an RB as a unit in frequency domain. In this case, the first entirety, the second entirety, and the third entirety are arranged in sequence from bottom to top. A quantity of RBs to which the first entirety is mapped in frequency domain is less than or equal to 12, a quantity of RBs to which the second entirety is mapped in frequency domain is 12, and a quantity of RBs to which the third entirety is mapped in frequency domain is less than or equal to 12. For example, the first entirety may be mapped to a total of 12 RBs from an RB 0 to an RB 11, the second entirety may be mapped to a total of 12 RBs from an RB 12 to an RB 23, and the third entirety may be mapped to a total of 12 RBs from an RB 24 to an RB 35.

For another example, as shown in (b) in FIG. 6, a difference between this design and that in (a) in FIG. 6 lies in that locations of the SSS and the PSS are exchanged.

For still another example, as shown in (c) in FIG. 6, the SSS and the PSS are TDMed, and are mapped to 12 same RBs in frequency domain, and the PBCH includes two parts: a first part and a second part. The first part and the second part are time-division multiplexed. The PSS and the SSS form a first entirety, and the first part and the second part form a second entirety. The first entirety and the second entirety are frequency-division multiplexed, and use an RB as a unit in frequency domain. In this case, the first entirety and the second entirety are arranged in sequence from bottom to top. The first entirety is mapped to 12 RBs in frequency domain, and a quantity of RBs to which the second entirety is mapped in frequency domain is less than or equal to 24. For example, the first entirety may be mapped to a total of 12 RBs from an RB 0 to an RB 11, and the second entirety may be mapped to a total of 24 RBs from an RB 12 to an RB 35.

For still another example, as shown in (d) in FIG. 6, a difference between this design and that in (c) in FIG. 6 lies in that locations of the SSS and the PSS are exchanged.

For still another example, as shown in (e) in FIG. 6, the SSS and the PSS are time-division multiplexed, and are mapped to 12 same RBs in frequency domain, and the PBCH includes two parts: a first part and a second part. The first part and the second part are time-division multiplexed. The first part and the second part form a first entirety, and the PSS and the SSS form a second entirety. The first entirety and the second entirety are frequency-division multiplexed, and use an RB as a unit in frequency domain. In this case, the first entirety and the second entirety are arranged in sequence from bottom to top. A quantity of RBs to which the first entirety is mapped in frequency domain is less than or equal to 24, and the second entirety are mapped to 12 RBs in frequency domain. For example, the first entirety may be mapped to a total of 24 RBs from an RB 0 to an RB 23, and the second entirety may be mapped to a total of 12 RBs from an RB 24 to an RB 35.

For still another example, as shown in (f) in FIG. 6, a difference between this design and that in (e) in FIG. 6 lies in that locations of the SSS and the PSS are exchanged.

It should be noted that, although in the SSB formats shown in (a) to (f) in FIG. 6, the SSS and the PSS are mapped to all subcarriers of the 12 RBs, this embodiment of this application is not limited thereto. In another embodiment, the SSS and the PSS each may alternatively be mapped to some subcarriers of the 12 RBs. Using (c) in FIG. 6 as an example, the SSS and the PSS are mapped to some subcarriers of the 12 RBs, for example, mapped to 127 subcarriers in the middle of 144 subcarriers of the 12 RBs.

In one embodiment, the PSS and the SSS are frequency-division multiplexed, the PSS and the SSS each are mapped to 12 RBs in frequency domain, the PBCH and the PSS are time-division multiplexed, and a quantity of RBs to which the PBCH is mapped in frequency domain is less than or equal to 36.

For example, as shown in (g) in FIG. 6, the PSS and the SSS are frequency-division multiplexed, and each are mapped to 12 RBs in frequency domain. The PSS and the SSS form a first entirety, and the first entirety uses an RB as a unit in frequency domain. In this case, the PSS and the SSS are arranged in sequence from bottom to top. The first entirety and the PBCH are time-division multiplexed, and a quantity of RBs to which the PBCH is mapped in frequency domain is less than or equal to 36. For example, the PSS is mapped to a total of 12 RBs from an RB 6 to an RB 17, the PSS is mapped to a total of 12 RBs from an RB 18 to an RB 29, and the PBCH is mapped to a total of 36 RBs from an RB 0 to an RB 35.

For another example, as shown in (h) in FIG. 6, a difference between this design and that in (g) in FIG. 6 lies in that locations of the SSS and the PSS are exchanged.

In one embodiment, the PBCH includes a first part and a second part, the second part includes a first block and a second block, the first block, the second block, the PSS, and the SSS are frequency-division multiplexed, the first part and the PSS are time-division multiplexed, the PSS and the SSS each are mapped to 12 RBs in frequency domain, the first block and the second block each are mapped to six RBs in frequency domain, and a quantity of RBs to which the second part is mapped in frequency domain is less than or equal to 36.

For example, as shown in (i) in FIG. 6, the PSS and the SSS are frequency-division multiplexed, and are mapped to 12 RBs in frequency domain. The PSS and the SSS form a first entirety, and the first entirety uses an RB as a unit in frequency domain. In this case, the PSS and the SSS are arranged in sequence from bottom to top. The first entirety, the first block, and the second block are frequency-division multiplexed. Further, the first entirety, the first block, and the second block form a second entirety, and the second entirety and the first part are time-division multiplexed. For example, the first block may be mapped to a total of six RBs from an RB 0 to an RB 5, the PSS is mapped to a total of 12 RBs from an RB 6 to an RB 17, the SSS is mapped to a total of 12 RBs from an RB 18 to an RB 29, and the second block is mapped to a total of six RBs from an RB 30 to an RB 35.

For another example, as shown in (j) in FIG. 6, a difference between this design and that in (i) in FIG. 6 lies in that locations of the SSS and the PSS are exchanged.

It should be noted that, although in the SSB formats shown in (g) to (j) in FIG. 6, the SSS and the PSS each are mapped to all subcarriers of the 12 RBs, this embodiment of this application is not limited thereto. In another embodiment, the SSS and the PSS each may alternatively be mapped to some subcarriers of the 12 RBs. Using (h) in FIG. 6 as an example, the SSS is mapped to the $7^{th}$ to the $18^{th}$ RBs in the 36 RBs, that is, some subcarriers of the total of 12 RBs.

In addition, it should be further noted that, in (a) to (h) in FIG. 6, "from bottom to top" is a direction of extension in frequency domain starting from a start RB (for example, an RB numbered 0) when an RB is used as a unit in frequency domain.

In this embodiment, locations of the PBCH, the SSS, and the PSS in the SSB that occupies two symbols are adjusted in frequency domain and in time domain, to flexibly set a format of the SSB.

The following describes in detail the candidate resource position set in the foregoing embodiment for each subcarrier spacing.

In one embodiment, when the subcarrier spacing is 30 kHz, a set of indexes of the first symbol of the resource position is a fourth set or a subset of the fourth set, and indexes of a symbol that are included in the fourth set are $\{0, 7, 14, 21\}+28\times b$, where $b\geq 0$ and b is an integer.

For example, for the subcarrier spacing of 30 kHz, 1 ms includes 28 symbols, and indexes of the 28 symbols are sequentially 0 to 27. Using 1 ms as an example of a period, the indexes of the symbol in the fourth set are $\{0, 7, 14, 21\}+28\times a$, where b represents the period. That the fourth set includes one period is used as an example. In one embodiment, when b=0, the indexes of the symbol in the fourth set are $\{0, 7, 14, 21\}$. In this case, indexes of the first symbol that are included in the candidate resource position set are $\{0, 7, 14, 21\}$, or indexes of the first symbol that are included in the candidate resource position set are a subset of the fourth set, for example, $\{0, 7\}$ or $\{0, 21\}$.

It should be noted that the index of the symbol in the fourth set is an index of the first symbol of the SSB. The SSB occupies two consecutive symbols. Therefore, after the index of the first symbol is determined, the indexes of the two symbols occupied by the SSB may be determined. For example, assuming that the index of the first symbol is 14 in the fourth set, it may be considered that the SSB occupies a symbol 14 and a symbol 15 in time domain.

In one embodiment, when the subcarrier spacing is 60 kHz, a set of indexes of the first symbol of the resource position is a fifth set or a subset of the fifth set, and symbols included in the fifth set are $\{0, 2, 7, 9, 14, 16, 21, 23\}+28\times c$, where $c\geq 0$ and c is an integer.

For example, a value of c is related to a length of an SSB window. When the length of the SSB window is 5 ms, b is equal to any one of 0 to 9. When the length of the SSB window is 10 ms, b is equal to any one of 0 to 19. For the subcarrier spacing of 60 kHz, 0.5 ms includes 28 symbols, and indexes of the 28 symbols are sequentially 0 to 27. Using 0.5 ms as an example of a period, the indexes of the symbol in the fifth set are $\{0, 2, 7, 9, 14, 16, 21, 23\}+28\times c$. When c=0, the indexes of the symbol in the fifth set are $\{0, 2, 7, 9, 14, 16, 21, 23\}$. In this case, indexes of the first symbol that are included in the candidate resource position set are $\{0, 2, 7, 9, 14, 16, 21, 23\}$, or are a subset of the fifth set, for example, $\{0, 2, 7, 9, 14\}$ or $\{16, 21, 23\}$.

The following uses an example in which the self-contained slot with the subcarrier spacing of 60 kHz is used to transmit data, and in a structure of the self-contained slot, first four symbols are used for DL transmission, the fifth symbol is a conversion symbol, and the sixth symbol and the seventh symbol are UL symbols, to describe the synchronization signal block transmission method in detail. For example, refer to FIG. 7.

Figure 7:
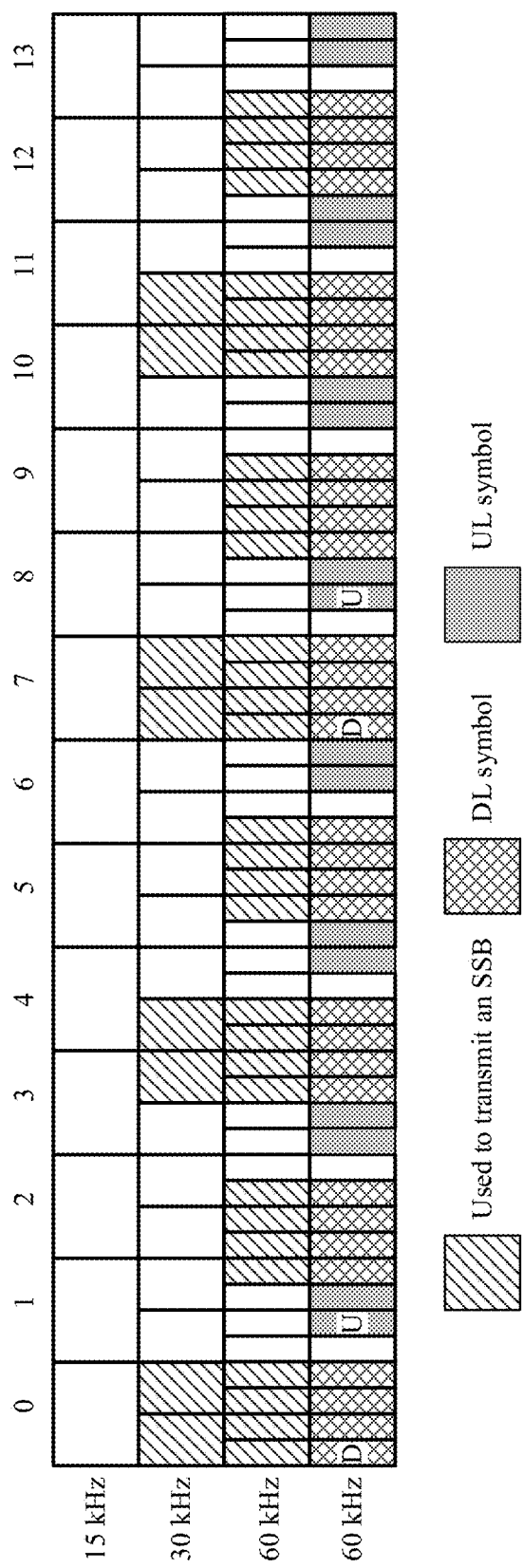
FIG. 7 is a schematic diagram of an example of a synchronization signal block transmission method according to an embodiment of this application.

FIG. 7 is a schematic diagram of an example of the synchronization signal block transmission method according to another embodiment of this application. As shown in FIG. 7:

When the SSB is transmitted at a subcarrier spacing of 30 kHz, indexes of a symbol in the fourth set are {0, 7, 14, 219}+28×b. That the fourth set includes one period is used as an example. In one embodiment, when b=0, the indexes of the symbol that are included in the fourth set are {0, 7, 14, 21} within 1 ms. Because a set of indexes of the first symbol of the (candidate) resource position is the fourth set or the subset of the fourth set, an index of the first symbol (which may also be understood as the first symbol of the SSB) of the (candidate) resource position may be the symbol 0 and the symbol 7, the symbol 0, or the symbol 7. Assuming that the first symbol of the resource position used to send the SSB is the symbol 7, the SSB occupies the symbol 7 and a symbol 8.

When the SSB is transmitted at a subcarrier spacing of 60 kHz, indexes of a symbol in the fifth set are {0, 2, 7, 9, 14, 16, 21, 23}. That the fifth set includes one period is used as an example. In one embodiment, when c=0, the indexes of the symbol that are included in the fifth set are{0, 2, 7, 9, 14, 16, 21, 23} within 0.5 ms. Because a set of indexes of the first symbol of the (candidate) resource position is the fifth set or the subset of the fifth set, an index of the first symbol (which may also be understood as the first symbol of the SSB) of the (candidate) resource position may be the symbol 0, the symbol 2, the symbol 7, and the symbol 9; the symbol 0; the symbol 7; or the like Assuming that the first symbol of the resource position used to send the SSB is the symbol 9, the SSB occupies the symbol 9 and a symbol 10.

It should be noted that, although in the foregoing embodiment, the self-contained slot with the subcarrier spacing of 60 kHz includes seven symbols, and in the seven symbols, the first four symbols are used for DL transmission, the fifth symbol is a conversion symbol, and the sixth symbol and the seventh symbol are UL symbols, this is not limited in this embodiment of this application. In another embodiment, the self-contained slot structure may alternatively be another structure. For example, the first three symbols are DL symbols, the fourth to the sixth symbols are conversion symbols, and the seventh symbol is a UL symbol. For another example, the self-contained slot with the subcarrier spacing of 60 kHz includes 14 symbols.

In the foregoing embodiment, after receiving the synchronization signal block (SSB) sent by the network device in the resource position of the SSB, the terminal device further receives first indication information sent by the network device. The first indication information is used to indicate, to the terminal device, the resource position that is in the candidate resource position set and that is used to transmit the SSB, or the first indication information is used to indicate, to the terminal device, a possible resource position that is in the candidate resource position set and that is used to transmit the SSB.

For example, after sending the SSB to the terminal device in the resource position of the SSB, the network device further sends the first indication information to the terminal device. Correspondingly, after receiving the SSB in the resource position of the SSB, the terminal device further receives the first indication information sent by the network device. The first indication information is used to indicate the resource position that is in the candidate resource position set and that is used to transmit the SSB. For example, when the SSB is transmitted at a subcarrier spacing of 30 kHz, the indexes of the symbol in the fourth set are {0, 7, 14, 21}+28×a. When a=0, the indexes of the symbol that are included in the fourth set are {0, 7, 14, 21} within 1 ms. In this case, a possible resource position of the SSB includes the symbol 0, the symbol 7, the symbol 14, and the symbol 21; the symbol 0 and the symbol 7; the symbol 0; or the symbol 7. Assuming that the first symbol occupied by the resource position used to send the SSB is the symbol 7, the SSB occupies the symbol 7 and a symbol 8. In this case, if the first indication information indicates that a set of first symbols of the resource position that may be used to transmit the SSB is the symbol 7, after receiving the first indication information, the terminal device determines that the SSB occupies the symbol 7 and the symbol 8. Based on the first indication information, when subsequently receiving a downlink channel, the terminal device does not receive the downlink channel on time-frequency resources on which the symbol 7 and the symbol 8 are located. If the first indication information indicates that a set of first symbols of the resource position that may be used to transmit the SSB is the symbol 0 and the symbol 7, after receiving the first indication information, the terminal device determines that the SSB may occupy the symbol 0 and the symbol 1, and may occupy the symbol 7 and the symbol 8. Based on the first indication information, when subsequently receiving a downlink channel, the terminal device does not receive the downlink channel on time-frequency resources on which the symbol 0, the symbol 1, the symbol 7 and the symbol 8 are located. For details, refer to the description of the foregoing Embodiment 1, and details are not described herein again.

In this embodiment of this application, the first indication information is used to indicate, to the terminal device, the resource position for transmitting the SSB, so that the terminal device does not detect, based on the first indication information, a PDCCH candidate time-frequency resource in the resource position for transmitting the SSB, or so that the terminal device performs, based on the first indication information, rate matching on a PDSCH on a resource for transmitting the SSB. This ensures that the resource for transmitting the SSB is not shared by another channel and that all terminals can access a system.

Embodiment 3

Compared with Embodiment 1 and Embodiment 2, in this embodiment, the resource position used to send the SSB is mapped to four symbols in time domain. Unless otherwise specified below, that the resource position is mapped to four symbols in time domain may also be understood as that the resource position occupies four symbols in time domain, in other words, the SSB occupies four symbols in time domain, or that the resource position includes four symbols in time domain. In this embodiment, when sending an SSB to a terminal device, a network device maps the SSB to one resource position in a candidate resource position set of the SSB for sending. The resource position is mapped to four symbols in time domain. This may also be understood that the SSB occupies four symbols. Correspondingly, the terminal device receives the SSB in the resource position of the SSB. The SSB includes a primary synchronization signal (PSS), a secondary synchronization signal (SSS), and a physical broadcast channel (PBCH). One resource position in the candidate resource position set is mapped to four symbols in time domain, the PSS, the SSS, and the PBCH are frequency-division multiplexed and time-division multiplexed in the resource position, and a subcarrier spacing corresponding to the resource position is 30 kHz or 60 kHz.

For example, in this embodiment of this application, the resource position resource set includes at least one resource position resource, a resource in each resource position is a candidate resource used by the network device to send an SSB to the terminal device, and each resource position resource is mapped to four symbols in time domain.

In the foregoing embodiment, the SSB may occupy four consecutive symbols, or the four symbols occupied by the SSB are inconsecutive in time domain. The following separately describes the two cases.

First, a design in which the SSB occupies four consecutive symbols is described.

When the SSB occupies four consecutive symbols, the PSS is mapped to the first symbol in the four consecutive symbols in time domain, the SSS is mapped to the third symbol in the four consecutive symbols in time domain, the PBCH is mapped to the second symbol, the third symbol, and the fourth symbol in the four consecutive symbols in time domain, a quantity of resource blocks RBs to which the SSB is mapped in frequency domain is less than or equal to 20, and the 20 RBs include RBs numbered 0 to 19. The PSS and the SSS are time-division multiplexed, and the PSS and the SSS are mapped, in a frequency, to 127 subcarriers in the middle of 144 subcarriers included in 12 RBs numbered 5 to 16; and when the PBCH is mapped to the second symbol or the fourth symbol in the four consecutive symbols in time domain, a quantity of RBs to which the PBCH is mapped in frequency domain is less than or equal to 20; or when the PBCH is mapped to the third symbol in the four consecutive symbols in time domain, the PBCH is mapped, in frequency domain, to subcarriers included in RBs numbered 1 to 4 and subcarriers included in RBs numbered 17 to 20. The following describes a structure of the SSB in the foregoing embodiment. For example, refer to FIG. 8.

Figure 8:
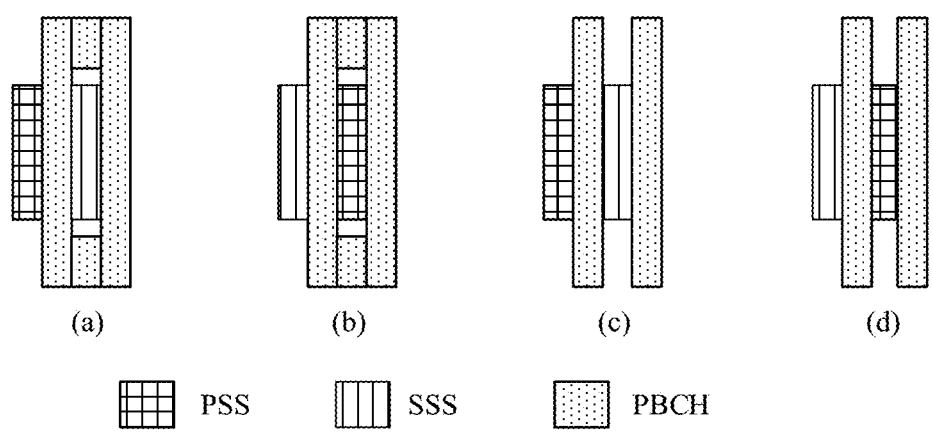
FIG. 8 is a schematic structural diagram of an SSB according to an embodiment of this application.

FIG. 8 is a schematic structural diagram of an SSB in a synchronization signal block transmission method according to still another embodiment of this application. Referring to FIG. 8, the SSB that occupies four consecutive symbols in time domain may be configured in the following formats:

For example, as shown in (a) in FIG. 8, the PBCH includes a first part, a second part, and a third part, and the second part includes a first block and a second block. In time domain, the PSS, the first part of the PBCH, the SSS, and the third part of the PBCH are arranged in sequence from left to right. The first block and the second block of the PBCH and the SSS are frequency-division multiplexed, and use an RB as a unit in frequency domain. In this case, the first block of the PBCH, the SSS, and the second block of the PBCH are arranged in sequence from bottom to top. A quantity of RBs to which the first part and the third part of the PBCH are mapped in frequency domain is less than or equal to 20, and subcarriers included in the 20 RBs are numbered from 0 to 239. The PSS and the SSS are mapped, in frequency domain, to subcarriers included in RBs numbered from 5 to 16. In one embodiment, the PSS and the SSS are mapped to the $56^{th}$ to the $182^{nd}$ subcarriers in the 20 RBs of the SSB in frequency domain, that is, the PSS and the SSS are mapped, in a frequency, to 127 subcarriers in the middle of 144 subcarriers included in the 12 RBs numbered from 5 to 16. The first block in the second part of the PBCH is mapped, in frequency domain, to subcarriers included in RBs numbered from 1 to 4. In one embodiment, the first block is mapped, in frequency domain, to subcarriers numbered from 0 to 47 in the 20 RBs of the SSB. The second block is mapped, in frequency domain, to subcarriers numbered from 192 to 239 in the 20 RBs of the SSB.

For another example, as shown in (b) in FIG. 8, a difference between this design and that in (a) in FIG. 8 lies in that locations of the SSS and the PSS are exchanged.

For still another example, as shown in (c) in FIG. 8, the PBCH includes a first part and a third part. In time domain, the PSS, the first part of the PBCH, the SSS, and the third part of the PBCH are arranged in sequence from left to right. A quantity of RBs to which the first part and the third part of the PBCH are mapped in frequency domain is less than or equal to 20, and subcarriers included in the 20 RBs are numbered from 0 to 239. The PSS and the SSS are mapped, in frequency domain, to subcarriers included in 12 RBs numbered from 5 to 16. In one embodiment, the PSS and the SSS are mapped, in frequency domain, to 127 subcarriers in the middle of 144 subcarriers included in the RBs numbered from 5 to 16. That is, the PSS and the SSS are mapped, in frequency domain, to the $56^{th}$ to the $182^{nd}$ subcarriers in 240 subcarriers included in the 20 RBs of the SSB.

For still another example, as shown in (d) in FIG. 8, a difference between this design and that in (c) in FIG. 8 lies in that locations of the SSS and the PSS are exchanged.

In this embodiment, locations of the PBCH, the SSS, and the PSS in the SSB that occupies four consecutive symbols are adjusted in frequency domain and in time domain, to flexibly set a format of the SSB.

In the foregoing embodiment, a resource position of one SSB is mapped to four consecutive symbols in time domain, and this is applicable to a scenario in which the SSB is sent by using a subcarrier spacing of 60 kHz. The following describes in detail the candidate resource position set in this scenario.

In one embodiment, when the subcarrier spacing used to send the SSB is a subcarrier spacing of 60 kHz, a set of indexes of the first symbol of a resource position in the candidate resource position set of the SSB is a sixth set or a subset of the sixth set, and symbols included in the sixth set are $\{0, 7, 14, 21\}+28\times c$, where $c \geq 0$ and c is an integer.

For example, a value of c is related to a length of an SSB window. When the length of the SSB window is 5 ms, b is equal to any one of 0 to 9. When the length of the SSB window is 10 ms, b is equal to any one of 0 to 19. For the subcarrier spacing of 60 kHz, 1 ms includes 56 symbols. Using 0.5 ms as an example of a period, the indexes of the symbol in the sixth set are $\{0, 7, 14, 21\}+28\times c$. That the sixth set includes one period is used as an example. In one embodiment, when c=0, the indexes of the symbol in the sixth set are $\{0, 7, 14, 21\}$. In this case, a set of indexes of the first symbol that are included in the candidate resource position set of the SSB is $\{0, 7, 14, 21\}$, or a subset of the sixth set, for example, $\{0\}$ and $\{7\}$.

It should be noted that the index of the symbol in the sixth set is an index of the first symbol of the SSB. Because the SSB occupies four consecutive symbols, after the index of the first symbol is determined, indexes of the four symbols occupied by the SSB may be determined. For example, assuming that the index of the first symbol is the symbol 7 in the sixth set, it may be considered that the SSB occupies a symbol 7, a symbol 8, a symbol 9, and a symbol 10 in time domain.

The following uses an example in which the self-contained slot with the subcarrier spacing of 60 kHz is used to transmit data, and in a structure of the self-contained slot, first four symbols are used for DL transmission, the fifth symbol is a conversion symbol, and the sixth symbol and the seventh symbol are UL symbols, to describe the synchronization signal block transmission method in detail. For example, refer to FIG. 9.

Figure 9:
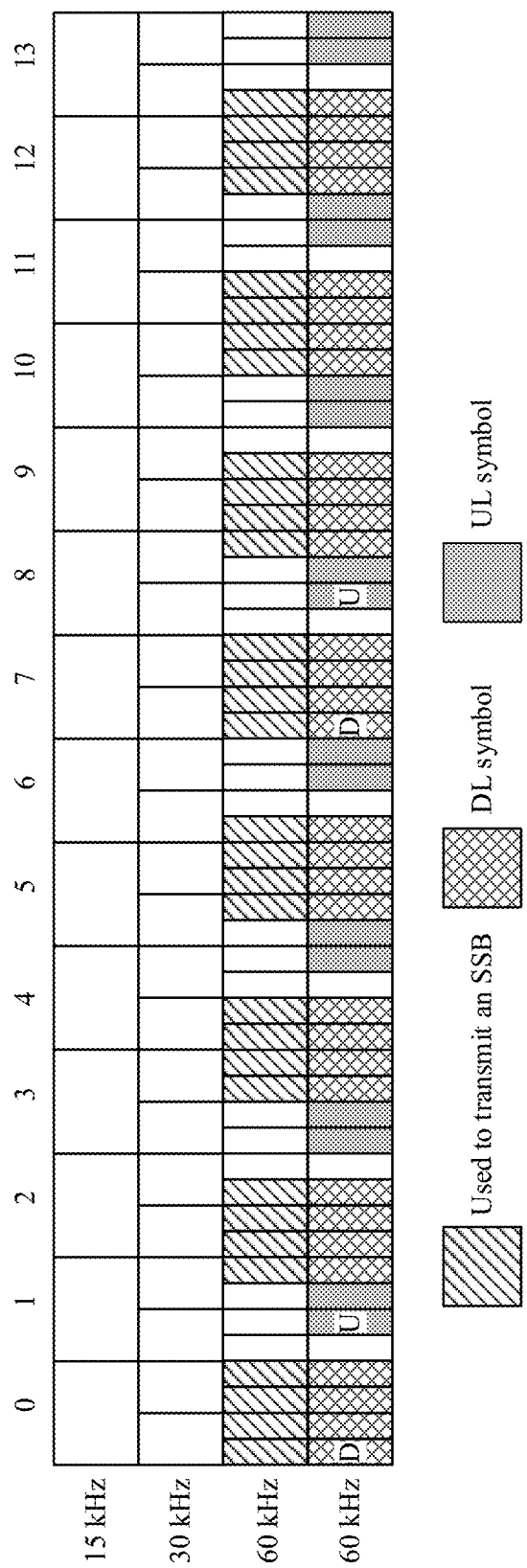
FIG. 9 is a schematic diagram of an example of a synchronization signal block transmission method according to an embodiment of this application.

FIG. 9 is a schematic diagram of an example of the synchronization signal block transmission method according to still another embodiment of this application. As shown in FIG. 9:

When the SSB is transmitted at a subcarrier spacing of 60 kHz, indexes of a symbol in the sixth set are {0, 7, 14, 21}+28×c. When c=0, the indexes of the symbols included in the sixth set are {0, 7, 14, 21} within 0.5 ms. Because a set of indexes of the first symbol of the candidate resource position of the SSB is the sixth set or the subset of the sixth set, an index of the first symbol (which may also be understood as the first symbol of the SSB) of the candidate resource position of the SSB may be the symbol 0, the symbol 7, the symbol 14, or the symbol 21; the symbol 0; the symbol 7; or the like. Assuming that the first symbol of the resource position is the symbol 7, the SSB occupies the symbol 7, a symbol 8, a symbol 9, and a symbol 10.

In the foregoing embodiment, after receiving the synchronization signal block SSB sent by the network device in the resource position of the SSB, the terminal device further receives first indication information sent by the network device. The first indication information is used to indicate, to the terminal device, the resource position that is in the candidate resource position set and that is used to transmit the SSB, or the first indication information is used to indicate, to the terminal device, a possible resource position that is in the candidate resource position set and that is used to transmit the SSB.

For example, after sending the SSB to the terminal device in the resource position of the SSB, the network device further sends the first indication information to the terminal device. Correspondingly, after receiving the SSB in the resource position of the SSB, the terminal device further receives the first indication information sent by the network device. The first indication information is used to indicate the resource position that is in the candidate resource position set and that is used to transmit the SSB. For example, when the SSB is transmitted at the subcarrier spacing of 60 kHz, the indexes of the symbol in the sixth set are {0, 7, 14, 21}+28×c. When c=0, the indexes of the symbol that are included in the sixth set are {0, 7, 14, 21} within 0.5 ms. In this case, if the first indication information is used to indicate that a set of first symbols in the resource position that may be used to transmit the SSB is the symbol 0 in the sixth set, after receiving the first indication information, the terminal device determines that the SSB occupies the symbol 0, a symbol 1, a symbol 2, and a symbol 3. Based on the first indication information, when subsequently receiving a downlink channel, the terminal device does not receive the downlink channel on time-frequency resources on which the symbol 0, the symbol 1, the symbol 2 and the symbol 3 are located. If the first indication information is used to indicate that a set of first symbols in the resource position that may be used to transmit the SSB is the symbol 0 and the symbol 7 in the sixth set, after receiving the first indication information, the terminal device determines that the SSB may occupy the symbol 0, a symbol 1, a symbol 2, and a symbol 3, or the SSB may occupy the symbol 7, a symbol 8, a symbol 9, and a symbol 10. Based on the first indication information, when subsequently receiving a downlink channel, the terminal device does not receive the downlink channel on time-frequency resources on which the symbol 0, the symbol 1, the symbol 2, the symbol 3, the symbol 7, the symbol 8, the symbol 9, and the symbol 10 are located. For details, refer to the description of the foregoing Embodiment 1, and details are not described herein again.

Next, a design in which the four symbols occupied by the SSB are inconsecutive is described.

When the four symbols occupied by the SSB are inconsecutive, one resource position in the candidate resource position set of the SSB occupies a first group of consecutive symbols and a second group of consecutive symbols in time domain, where the first group of consecutive symbols and the second group of consecutive symbols are separated by x symbols, where x≥1 and x is an integer. The following describes a structure of the SSB in the foregoing embodiment. For example, refer to FIG. 10.

Figure 10:
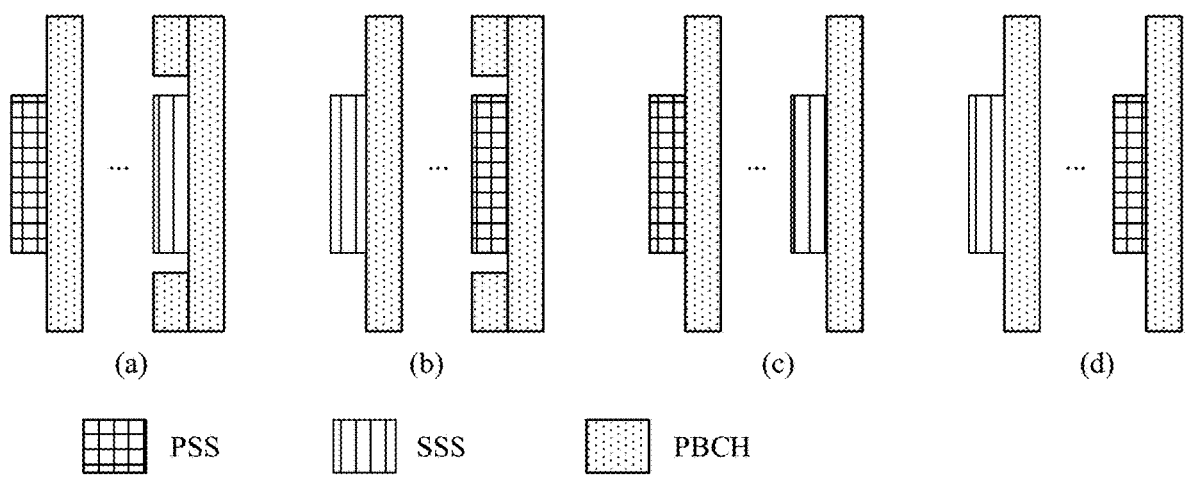
FIG. 10 is a schematic structural diagram of an SSB according to an embodiment of this application.

FIG. 10 is a schematic structural diagram of an SSB in a synchronization signal block transmission method according to still another embodiment of this application. Referring to FIG. 10, the SSB that occupies four inconsecutive symbols in time domain may be configured in the following formats:

For example, as shown in (a) in FIG. 10, the PSS is mapped to the first symbol in the first group of consecutive symbols in time domain, the SSS is mapped to the first symbol in the second group of consecutive symbols in time domain, and the PBCH is mapped to the second symbol in the first group of consecutive symbols and the first symbol and the second symbol in the second group of consecutive symbols in time domain.

For example, the PBCH includes a first part, a second part, and a third part, and the second part includes a first block and a second block. In time domain, the PSS, the first part of the PBCH, the SSS, and the third part of the PBCH of the SSB are arranged in sequence from left to right. There are x symbols between the first part of the PBCH and the SSS. The first block and the second block of the PBCH and the SSS are frequency-division multiplexed, and use an RB as a unit in frequency domain. In this case, the first block of the PBCH, the SSS, and the second block of the PBCH are arranged in sequence from bottom to top. A quantity of RBs to which the first part and the third part of the PBCH of the SSB are mapped in frequency domain is less than or equal to 20, and subcarriers included in the 20 RBs are numbered from 0 to 239. The PSS and the SSS are mapped, in frequency domain, to subcarriers included in RBs numbered from 5 to 16. In one embodiment, the PSS and the SSS are mapped, in frequency domain, to 127 subcarriers in the middle of 144 subcarriers included in the RBs numbered from 5 to 16. That is, the PSS and the SSS are mapped, in frequency domain, to subcarriers numbered from 56 to 182 in 240 subcarriers included in the 20 RBs. The first block in the second part of the PBCH is mapped, in frequency domain, to subcarriers included in RBs numbered from 1 to 4. In one embodiment, the first block is mapped, in frequency domain, to subcarriers numbered from 0 to 47. The second block is mapped, in frequency domain, to subcarriers numbered from 192 to 239.

For another example, as shown in (b) in FIG. 10, the SSS is mapped to the first symbol in the first group of consecutive symbols in time domain, the PSS is mapped to the first symbol in the second group of consecutive symbols in time domain, and the PBCH is mapped to the second symbol in the first group of consecutive symbols and the first symbol and the second symbol in the second group of consecutive symbols in time domain.

A difference between this design and (a) in FIG. 10 lies in that locations of the SSS and the PSS are exchanged.

For still another example, as shown in (c) in FIG. 10, the PSS is mapped to the first symbol in the first group of consecutive symbols in time domain, the SSS is mapped to the first symbol in the second group of consecutive symbols in time domain, and the PBCH is mapped to the second symbol in the first group of consecutive symbols and the second symbol in the second group of consecutive symbols in time domain.

For example, the PBCH includes a first part and a third part. In time domain, the PSS, the first part of the PBCH, the SSS, and the third part of the PBCH are arranged in sequence from left to right. There are x symbols between the first part of the PBCH and the SSS. A quantity of RBs to which the first part and the third part of the PBCH are mapped in frequency domain is less than or equal to 20, and subcarriers included in the 20 RBs are numbered from 0 to 239. The PSS and the SSS are mapped, in frequency domain, to subcarriers included in RBs numbered from 5 to 16. In one embodiment, the PSS and the SSS are mapped, in frequency domain, to 127 subcarriers in the middle of 144 subcarriers included in the 12 RBs numbered from 5 to 16. That is, the PSS and the SSS are mapped, in frequency domain, to subcarriers numbered from 56 to 182 in 240 subcarriers included in the 20 RBs.

For still another example, as shown in (d) in FIG. 10, the SSS is mapped to the first symbol in the first group of consecutive symbols in time domain, the PSS is mapped to the first symbol in the second group of consecutive symbols in time domain, and the PBCH is mapped to the second symbol in the first group of consecutive symbols and the second symbol in the second group of consecutive symbols in time domain.

A difference between this design and (c) in FIG. 10 lies in that locations of the SSS and the PSS are exchanged.

In the foregoing embodiment, one resource position is mapped to four consecutive symbols in time domain, and this is applicable to a scenario in which the SSB is sent by using a subcarrier spacing of 30 kHz or 60 kHz. The following describes in detail the candidate resource position set in this scenario.

In one embodiment, the subcarrier spacing is 30 kHz, a set of indexes of the first symbol of the resource position is a seventh set or a subset of the seventh set, and symbols included in the seventh set are $\{0, 14\}+28\times b$, where $b \geq 0$ and b is an integer.

For example, for the subcarrier spacing of 30 kHz, 1 ms includes 28 symbols. Using 1 ms as an example of a period, the indexes of the symbol in the seventh set are $\{0, 14\}+28\times b$, where b represents the period. When b=0, indexes of a symbol in the seventh set are $\{0, 14\}$ within 1 ms. In this case, indexes of the first symbol that are included in the candidate resource position set are $\{0, 14\}$, or a subset of the seventh set, for example, $\{0\}$ or $\{14\}$.

It should be noted that the index of the symbol in the seventh set is an index of the first symbol of the SSB. Because the SSB occupies four inconsecutive symbols, the four inconsecutive symbols include the first group of consecutive symbols and the second group of consecutive symbols, and the first group of consecutive symbols and the second group of consecutive symbols are separated by x symbols, after the index of the first symbol is determined, indexes of the four symbols occupied by the SSB can be determined. For example, assuming that x=7, and the index of the first symbol is 0 in the seventh set, it may be considered that the SSB occupies a symbol 0, a symbol 1, a symbol 7, and a symbol 8 in time domain.

In one embodiment, when the subcarrier spacing used to send the SSB is a subcarrier spacing of 60 kHz, a set of indexes of the first symbol of the candidate resource position of the SSB is an eighth set or a subset of the eighth set, and symbols included in the eighth set are $\{0, 2, 14, 16\}+28\times c$, where $c \geq 0$ and c is an integer.

For example, for the subcarrier spacing of 60 kHz, 1 ms includes 56 symbols. Using 0.5 ms as an example of a period, the indexes of the symbol in the eighth set are $\{0, 2, 14, 16\}+28\times c$, where c represents the period. When c=0, indexes of a symbol in the eighth set are $\{0, 2, 14, 16\}$. In this case, indexes of the first symbol that are included in the candidate resource position set are $\{0, 2, 14, 16\}$, or a subset of the eighth set, for example, $\{0\}$, $\{2\}$, or $\{2, 14\}$.

It should be noted that the index of the symbol in the eighth set is an index of the first symbol of the SSB. Because the SSB occupies four inconsecutive symbols, the four inconsecutive symbols include the first group of consecutive symbols and the second group of consecutive symbols, and the first group of consecutive symbols and the second group of consecutive symbols are separated by x symbols, after the index of the first symbol is determined, indexes of the four symbols occupied by the SSB can be determined. For example, assuming that x=7, and the index of the first symbol is 2 in the eighth set, it may be considered that the SSB occupies a symbol 2, a symbol 3, a symbol 9, and a symbol 10 in time domain.

The following uses an example in which x=7, the self-contained slot with the subcarrier spacing of 60 kHz is used to transmit data, and in a structure of the self-contained slot, first four symbols are used for DL transmission, the fifth symbol is a conversion symbol, and the sixth symbol and the seventh symbol are UL symbols, to describe the synchronization signal block transmission method in detail. For example, refer to FIG. 11.

Figure 11:
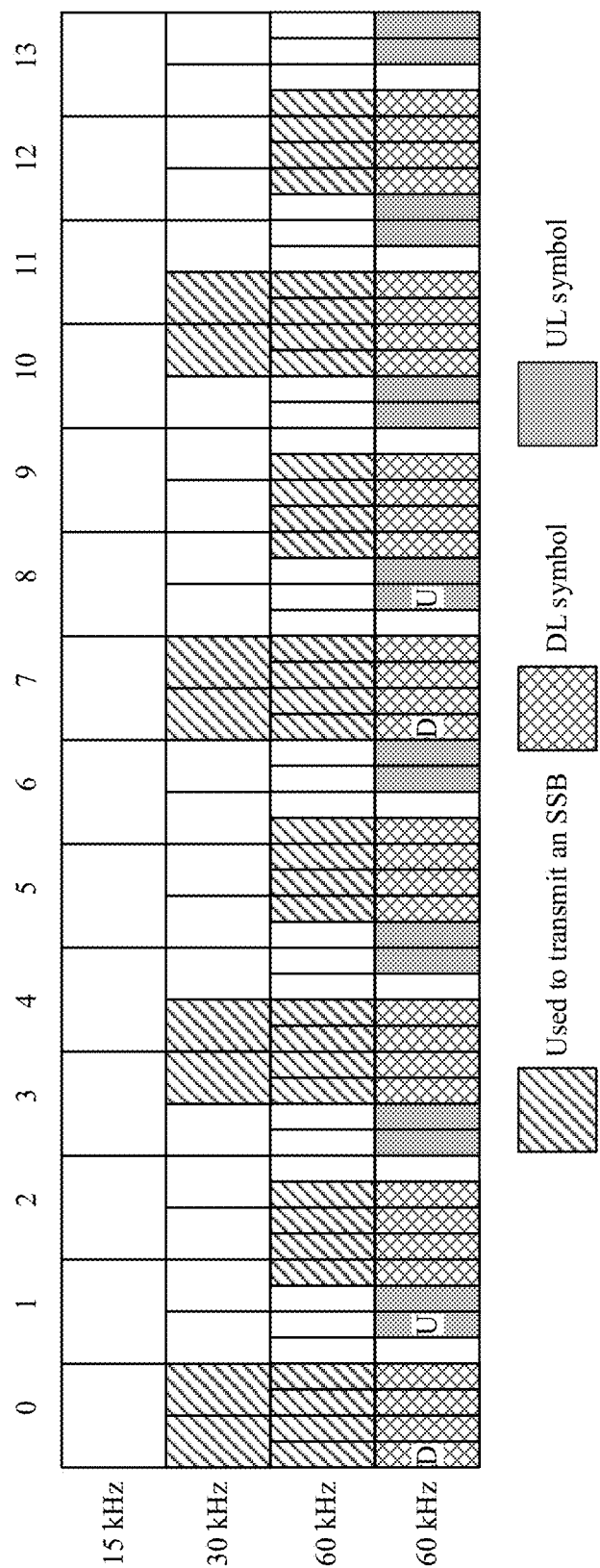
FIG. 11 and FIG. 12 are schematic diagrams of examples of a synchronization signal block transmission method according to an embodiment of this application.

FIG. 11 is a schematic diagram of an example of the synchronization signal block transmission method according to still another embodiment of this application. As shown in FIG. 11:

When the SSB is transmitted at a subcarrier spacing of 30 kHz, indexes of a symbol in the seventh set are $\{0, 14\}+28\times b$. When b=0, an index of a symbol that are included in the seventh set is $\{0\}$ within 0.5 ms. Because a set of indexes of the first symbol of the resource position is the seventh set or the subset of the seventh set, an index of the first symbol (which may also be understood as the first symbol of the SSB) of the resource position is a symbol 0, and the SSB occupies the symbol 0, a symbol 1, a symbol 7, and a symbol 8.

In addition, when the synchronization signal block transmission method is used in a new radio (NR) communications system, the PBCH in the SSB is used to transmit a master information block (MIB) that is on an NR carrier. A DMRS on the PBCH is sent by the network device to the terminal device, and is used to demodulate the PBCH.

One redundancy version (RV) of the MIB is mapped to the symbol 1, and another redundancy version is mapped to the symbol 7 and the symbol 8. Alternatively, one RV of the MIB is mapped to the symbol 1, and another RV is mapped to the symbol 8. A frequency domain offset v for mapping of the DMRS in the PBCH is mod 3 of a physical cell ID (PCID), that is, v=PCID mod 3, and initialization of a DMRS sequence is also PCID mod 3. MIB information in the PBCH on the symbol 1 and MIB information in the PBCHs on the symbols 7 and 8 are repeated.

When the SSB is transmitted at a subcarrier spacing of 60 kHz, indexes of a symbol in the eighth set are $\{0, 2, 14, 16\}+28\times a$. When a=0, the indexes of the symbol that are included in the eighth set are $\{0, 2, 14, 16\}$ within 0.5 ms. Because a set of indexes of the first symbol of the candidate resource position of the SSB is the eighth set or the subset of the eighth set, an index of the first symbol (which may also be understood as the first symbol of the SSB) of the resource position may be the symbol 0, the symbol 2, the symbol 14, and the symbol 16; the symbol 0; the symbol 2; or the like. Assuming that the first symbol of the resource position is the symbol 2, the SSB occupies the symbol 2, a symbol 3, a symbol 9, and a symbol 10.

It should be noted that, although in the foregoing embodiment, the self-contained slot with the subcarrier spacing of 60 kHz includes seven symbols, and in the seven symbols, the first four symbols are used for DL transmission, the fifth symbol is a conversion symbol, and the sixth symbol and the seventh symbol are UL symbols, this is not limited in this embodiment of this application. In another embodiment, the self-contained slot structure may alternatively be another structure. For example, the first three symbols are DL symbols, the fourth to the sixth symbols are conversion symbols, and the seventh symbol is a UL symbol. For another example, the self-contained slot with the subcarrier spacing of 60 kHz includes 14 symbols.

In the foregoing embodiment, after receiving the synchronization signal block SSB sent by the network device in the resource position of the SSB, the terminal device further receives first indication information sent by the network device. The first indication information is used to indicate, to the terminal device, the resource position that is in the candidate resource position set and that is used to transmit the SSB, or the first indication information is used to indicate, to the terminal device, a possible resource position that is in the candidate resource position set and that is used to transmit the SSB.

For example, after sending the SSB to the terminal device in the resource position of the SSB, the network device further sends the first indication information to the terminal device. Correspondingly, after receiving the SSB in the resource position of the SSB, the terminal device further receives the first indication information sent by the network device. The first indication information is used to indicate the resource position that is in the candidate resource position set and that is used to transmit the SSB. For example, when the SSB is transmitted at the subcarrier spacing of 60 kHz, the indexes of the symbol in the eighth set are {0, 2, 14, 16}+28×a. In this case, if the first indication information is used to indicate that a set of first symbols in the resource position that may be used to transmit the SSB is the symbol 2 in the eighth set, after receiving the first indication information, the terminal device determines that the SSB occupies the symbol 2, a symbol 3, a symbol 9, and a symbol 10. Based on the first indication information, when subsequently receiving a downlink channel, the terminal device does not receive the downlink channel on time-frequency resources on which the symbol 2, the symbol 3, the symbol 9 and the symbol 10 are located. If the first indication information is used to indicate that a set of first symbols in the resource position that may be used to transmit the SSB is the symbol 2 and the symbol 14 in the eighth set, after receiving the first indication information, the terminal device determines that the SSB may occupy the symbol 2, a symbol 3, a symbol 9, and a symbol 10, or may occupy the symbol 14, a symbol 15, a symbol 21, and a symbol 22. Based on the first indication information, when subsequently receiving a downlink channel, the terminal device does not receive the downlink channel on time-frequency resources on which the symbol 2, the symbol 3, the symbol 9, the symbol 10, the symbol 14, the symbol 15, the symbol 21, and the symbol 22 are located. For details, refer to the description of the foregoing Embodiment 1, and details are not described herein again.

It should be noted that the foregoing descriptions about the MIB, the DMRS, the PBCH, and the like are also applicable to the foregoing scenarios in which the SSB occupies four consecutive symbols in Embodiment 1, Embodiment 2, and Embodiment 3.

Embodiment 4

In Embodiment 1 to Embodiment 3, or in another possible design (which is not limited in this application) of the candidate resource position of the SSB, the network device further sends the first indication information to the terminal device. Correspondingly, the terminal device further receives the first indication information sent by the network device. The first indication information is used to indicate, to the terminal device, a resource position that is in the candidate resource position set and that is used to transmit the SSB, or is used to indicate, to the terminal device, a possible resource position that is in the candidate resource position set and that is used to transmit the SSB. For example, after sending the SSB to the terminal device in the resource position of the SSB, the network device further sends the first indication information to the terminal device based on the SSB by using a system information block. Correspondingly, the terminal device receives the first indication information. For example, the network device sends a system information block 1 (SIB1) to the terminal device, where the SIB1 carries the first indication information. The terminal device may receive the SSB; determine a time-frequency position of a candidate set of a physical downlink control channel (PDCCH) based on the SSB; and perform blind detection in the time-frequency position to receive the PDCCH. The terminal device receives a physical downlink shared channel (PDSCH) based on downlink control information (DCI) in the PDCCH, parses out the system information SIB1 from the PDSCH, and determines the first indication information based on the SIB1.

In one embodiment, the first indication information is further used to implicitly indicate a first candidate resource position set. The first candidate resource position set is a subset of the candidate resource position set of the SSB, and is a set of resource positions used to transmit the SSB in the candidate resource position set of the SSB. For example, the candidate resource position set of the SSB includes L resource positions, sequence numbers of the L resource positions are 1 to L in sequence, and the first candidate resource position set is a subset of the candidate resource position set. When L is an even number, the first candidate resource position set includes L/2 resource positions. When L is an odd number, the first candidate resource position set includes $$(L+1)/2 \text{ or } \frac{L+1}{2} - 1$$

resource positions. When a sequence number of the resource position that is used to transmit the SSB and that is indicated by the first indication information is an even number, a resource position included in the first candidate resource position set is an even-numbered resource position in candidate resource positions of the SSB. When a sequence number of the resource position that is used to transmit the SSB and that is indicated by the first indication information is an odd number, a resource position included in the first candidate resource position set is an odd-numbered resource position in candidate resource positions of the SSB. For example, it is assumed that the candidate resource position set includes five resource positions, and sequence numbers of the five resource positions are 1, 2, 3, 4, and 5. When the first indication information indicates that the resource position of the SSB is a sequence number 2 and/or a sequence number 4, it implicitly indicates that the first candidate resource position set is {2, 4}. When the first indication information indicates that resource positions of the SSB are sequence numbers 1, 3, 5, 1 and 3, 1 and 5, or 1, 3 and 5, it implicitly indicates that the first candidate resource position set is {1, 3, 5}. The network device sends the first indication information to the terminal device based on the SSB by using a system information block.

In the foregoing embodiment, the system information block is, for example, the SIB1. When sending the SIB1, the network device adds the first indication information to the SIB1 and sends the SIB1 to the terminal device. The first indication information is used to indicate, to the terminal device, a resource position that is in the candidate resource position set and that is used to transmit the SSB, or is used to indicate, to the terminal device, a possible resource position that is in the candidate resource position set and that is used to transmit the SSB. In this process, the network device controls the resource position of the SSB, and the network device indicates the resource position of the SSB to the terminal device.

For example, a structure of the first indication information may be as follows:
 ssb-PositionsInBurst CHOICE {
  shortBitmap BIT STRING (SIZE (4)),//indicates a resource position for transmitting an SSB in sub-3G
  mediumBitmap BIT STRING (SIZE (8)),//indicates a resource position for transmitting an SSB in 3G to 6G
  longBitmap BIT STRING (SIZE (64))//indicates a resource position for transmitting an SSB above 6G
 }

In another embodiment, the network device may alternatively send the first indication information to the terminal device by using higher layer signaling, for example, radio resource control (RRC) signaling or other signaling. This is not limited in this application.

The following describes in detail the synchronization signal block transmission method by using an example in which when a plurality of subcarrier spacings that are sensitive to latency reliability coexist, the SSB occupies four consecutive symbols, the SSB is transmitted at the subcarrier spacing of 30 kHz, and data is transmitted at the subcarrier spacing of 60 kHz. For example, refer to FIG. 12.

Figure 12:
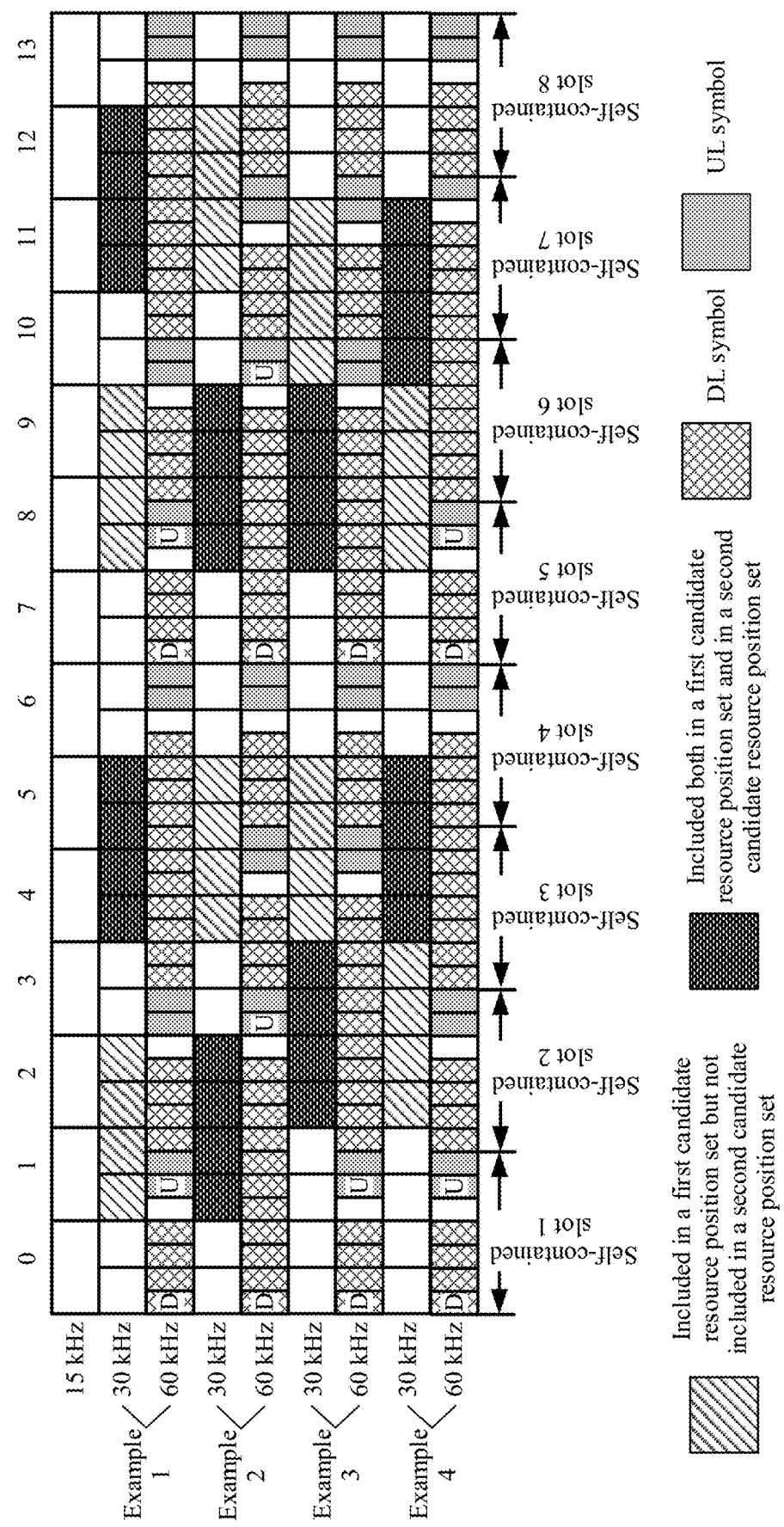

FIG. 12 is a schematic diagram of an example of the synchronization signal block transmission method according to still another embodiment of this application. As shown in FIG. 12, there are the following four examples:

Example 1

In this example, for the subcarrier spacing of 30 kHz, 1 ms includes 28 symbols, and indexes of the 28 symbols are sequentially 0 to 27. Using 1 ms as an example of a period, indexes of a symbol in a ninth set are $\{2, 8, 16, 22\}+28\times b$, where b represents the period. When b=0, the indexes of the symbol in the ninth set are {2, 8, 16, 22}. In this case, the indexes of the symbol that are included in the candidate resource position set are {2, 8, 16, 22}. Indexes of a symbol that is used to transmit an SSB and that is indicated by the first indication information are {8, 22}, or a subset of the set {8, 22}, for example, {8} or {22}. The symbol in the candidate resource position set is the first symbol in the four consecutive symbols occupied by the SSB. Assuming that the first symbol of the resource position used to transmit the SSB is a symbol 22, the SSB occupies the symbol 22, a symbol 23, a symbol 24, and a symbol 25.

Example 2

In this example, for the subcarrier spacing of 30 kHz, 1 ms includes 28 symbols, and indexes of the 28 symbols are sequentially 0 to 27. Using 1 ms as an example of a period, indexes of a symbol in a ninth set are $\{2, 8, 16, 22\}+28\times b$, where b represents the period. When b=0, the indexes of the symbol in the ninth set are {2, 8, 16, 22}. In this case, the indexes of the symbol that are included in the candidate resource position set are {2, 8, 16, 22}. Indexes of a symbol that is used to transmit an SSB and that is indicated by the first indication information are {2, 16}, or a subset of the set {2, 16}, for example, {2} or {16}. The symbol in the candidate resource position set is the first symbol in the four consecutive symbols occupied by the SSB. Assuming that the first symbol of the resource position used to transmit the SSB is a symbol 2, the SSB occupies the symbol 2, a symbol 3, a symbol 4, and a symbol 5.

In addition, the example 2 may also be understood as a variant of the example 1. In the example 1, within 0.5 ms, in a structure of each of a self-contained slot 1, a self-contained slot 2, and a self-contained slot 4, the first three symbols are DL symbols, the fourth to the sixth symbols are conversion symbols, and the seventh symbol is a UL symbol. Seven symbols in a self-contained slot 3 are all DL symbols. In this case, to avoid a conflict between a symbol used to transmit the SSB and a symbol used to transmit downlink data by using 60 kHz, indexes of a symbol that are included in a first resource position set are {8, 22}. If positions of the self-contained slot 1 and the self-contained slot 3 are exchanged, and positions of the self-contained slot 2 and the self-contained slot 4 are exchanged, indexes of the first symbol that are included in the candidate resource position set are {2, 8, 16, 22}. Indexes of a symbol that are included in the first resource position set are {2, 16}, or a subset of the set {2, 16}, for example, {2} or {16}. In this way, the example 2 is obtained.

Example 3

In this example, for the subcarrier spacing of 30 kHz, 1 ms includes 28 symbols, and indexes of the 28 symbols are sequentially 0 to 27. Using 1 ms as an example of a period, indexes of a symbol in a tenth set are $\{4, 8, 16, 20\}+28\times b$, where b represents the period. When b=0, the indexes of the symbol in the tenth set are {4, 8, 16, 20}. In this case, the indexes of the symbol that are included in the candidate resource position set are {4, 8, 16, 20}. Indexes of a symbol that are included in the first resource position set are {4, 16}, or a subset of the set {4, 16}, for example, {4} or {16}. The symbol in the candidate resource position set is the first symbol in the four consecutive symbols occupied by the SSB. Assuming that the first symbol of the resource position used to transmit the SSB is a symbol 16, the SSB occupies the symbol 16, a symbol 17, a symbol 18, and a symbol 19.

Example 4

In this example, for the subcarrier spacing of 30 kHz, 1 ms includes 28 symbols, and indexes of the 28 symbols are sequentially 0 to 27. Using 1 ms as an example of a period, indexes of a symbol in a tenth set are {4, 8, 16, 20}+28×b, where b represents the period. When b=0, the indexes of the symbol in the tenth set are {4, 8, 16, 20}. In this case, the indexes of the symbol that are included in the candidate resource position set are {4, 8, 16, 20}. Indexes of a symbol that are included in the first resource position set are {8, 20}, or a subset of the set {8, 20}, for example, {8} or {20}. The symbol in the candidate resource position set is the first symbol in the four consecutive symbols occupied by the SSB. Assuming that the first symbol of the resource position used to transmit the SSB is a symbol 8, the SSB occupies the symbol 8, a symbol 9, a symbol 10, and a symbol 11.

It can be learned from the example 1 to the example 4 described above that when the SSB is transmitted at the subcarrier spacing of 30 kHz, within 0.5 ms, the terminal device performs blind detection on the SSB only in positions of one group of four consecutive symbols (for example, symbols 8 to 11), and does not need to perform blind detection on the SSB in positions of two groups of four consecutive symbols (for example, symbols 2 to 5 and symbols 8 to 11), thereby reducing a quantity of times of blind detection performed by the terminal device, reducing power consumption of the terminal device, and ensuring that there are three self-contained slots for a subcarrier spacing of 60 kHz within 0.5 ms.

In addition, the example 1 may also be understood as follows: When there are two resource positions in the candidate resource position set within 0.5 ms, the terminal device does not expect to receive, within 0.5 ms, SSBs transmitted by the network device in two adjacent resource positions in the candidate resource position set. In this case, the network device sends the first indication information to the terminal device, to indicate, to the terminal device, the resource position used to transmit the SSB and implicitly indicate the first candidate resource position set. It can be learned from the candidate resource position set and the first candidate resource position set that, in two adjacent resource positions in the candidate resource position set, only one resource position is used to transmit the SSB. That is, in the foregoing code, resource positions indicated by any two 1 in inOneGroup in ssb-PositionsInBurst are not adjacent.

In the foregoing embodiments provided in this application, the methods provided in the embodiments of this application are separately described from perspectives of the network device, the terminal device, and interaction between the network device and the terminal device. To implement functions in the foregoing methods provided in the embodiments of this application, the network device and the terminal device may include a hardware structure and/or a software module, and implement the foregoing functions in a form of the hardware structure, the software module, or a combination of the hardware structure and the software module. Whether a particular function in the foregoing functions is performed by the hardware structure, the software module, or the combination of the hardware structure and the software module may depend on a particular application and a design constraint of the technical solutions.

Figure 13:
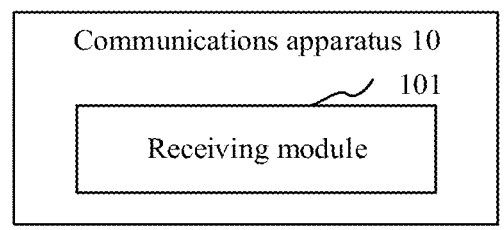
FIG. 13 to FIG. 16 are structural diagrams of modules of a communications apparatus according to an embodiment of this application.

FIG. 13 is a structural diagram of modules of a communications apparatus according to an embodiment of this application. The apparatus may be a terminal device, or may be an apparatus that can support a terminal device in implementing a function of the terminal device in the methods provided in the embodiments of this application. For example, the apparatus may be an apparatus in a terminal device or a chip system. As shown in FIG. 13, the communications apparatus 10 includes a receiving module 101. In this embodiment of this application, the chip system may include a chip, or may include a chip and another discrete component.

In one embodiment, the receiving module 101 is configured to receive a synchronization signal block (SSB) sent by a network device in a resource position of the SSB, where the resource position of the SSB is included in a candidate resource position set of the SSB, and the SSB includes a primary synchronization signal (PSS), a secondary synchronization signal (SSS), and a physical broadcast channel (PBCH). For a particular design of the resource position in the candidate resource position set, refer to the description in the method embodiments. Details are not described herein again.

The receiving module 101 may be further configured to receive first indication information sent by the network device, where the first indication information is used to indicate, to the terminal device, the resource position that is in the candidate resource position set and that is used to transmit the SSB, or the first indication information is used to indicate, to the terminal device, a possible resource position that is in the candidate resource position set and that is used to transmit the SSB.

The communications apparatus 10 may further include a processing module 102, configured to process the SSB and/or the first indication information received by the receiving module 101.

Figure 14:
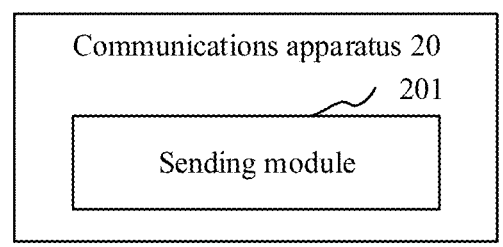

FIG. 14 is a structural diagram of modules of a communications apparatus according to another embodiment of this application. The apparatus may be a network device, or may be an apparatus that can support a network device in implementing a function of the network device in the methods provided in the embodiments of this application. For example, the apparatus may be an apparatus in a network device or a chip system. As shown in FIG. 14, the communications apparatus 20 includes a sending module 201.

In one embodiment, the sending module 201 is configured to send a synchronization signal block (SSB) to a terminal device in a resource position of the SSB, where the resource position of the SSB is included in a candidate resource position set of the SSB, and the SSB includes a primary synchronization signal (PSS), a secondary synchronization signal (SSS), and a physical broadcast channel (PBCH). For a particular design of the resource position in the candidate resource position set, refer to the description in the method embodiments. Details are not described herein again.

In one embodiment, the sending module 201 is further configured to send first indication information to the terminal device, where the first indication information is used to indicate, to the terminal device, the resource position that is in the candidate resource position set and that is used to transmit the SSB, or the first indication information is used to indicate, to the terminal device, a possible resource position that is in the candidate resource position set and that is used to transmit the SSB.

The communications apparatus 20 may further include a processing module 202, configured to generate the SSB and/or the first indication information sent by the sending module 201.

Division into modules in the embodiments of this application is an example, is merely logical function division, and may be other division during actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 15:
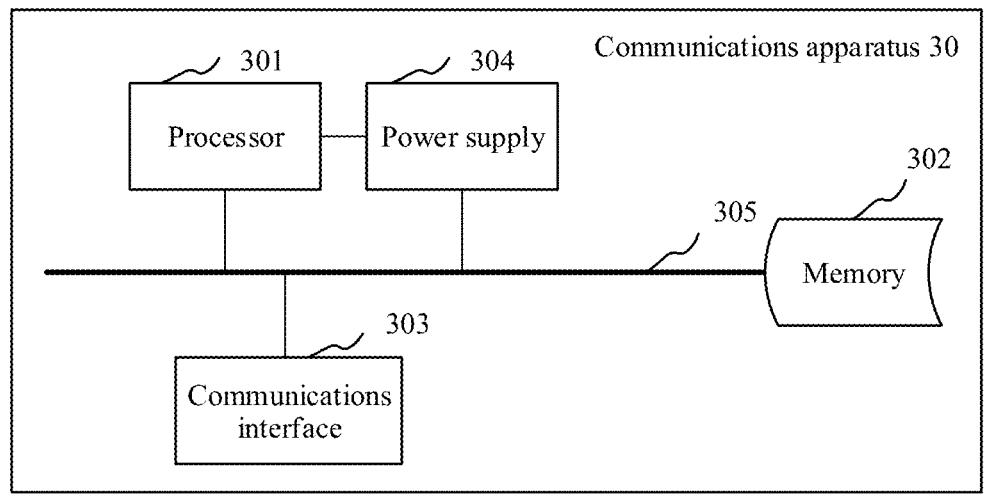

FIG. 15 is a schematic structural diagram of a communications apparatus according to still another embodiment of this application. As shown in FIG. 15, the communications apparatus 30 may include a processor 301, configured to implement a function of the terminal device in the methods provided in the embodiments of this application. The apparatus 30 may further include a memory 302 and/or a communications interface 303. Information may be sent and/or received through the communications interface 303. The memory 302 may store a program instruction. When the processor 301 invokes and executes the program instruction stored in the memory 302, the function of the terminal device in the methods provided in the embodiments of this application may be implemented.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, operations, and logical block diagrams disclosed in the embodiments of this application. The general-purpose processor may be a microprocessor or any conventional processor or the like. The operations of the methods disclosed with reference to the embodiments of this application may be directly performed by a hardware processor, or may be performed by using a combination of hardware in the processor and a software module.

In this embodiment of this application, the memory may be a non-volatile memory, for example, a hard disk (hard disk drive, HDD) or a solid-state drive (SSD), or may be a volatile memory, for example, a random access memory (RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store a program instruction and/or data.

In this embodiment of this application, the communications interface may be a circuit, a bus, an interface, a transceiver, or another apparatus that can be configured to receive or send information. This is not limited in this application.

In one embodiment, the communications apparatus 30 may further include a power supply 304 and/or a communications bus 305. The communications bus 305 is configured to implement communication connection between elements. In this embodiment of this application, the communications bus may be represented by using a bold line. A manner of connection between other components is merely an example for description, and is not limited thereto. The communications bus may be classified into an address bus, a data bus, a control bus, and the like. For ease of representation, only one thick line is used to represent the bus in the figure, but this does not mean that there is only one bus or only one type of bus.

Figure 16:
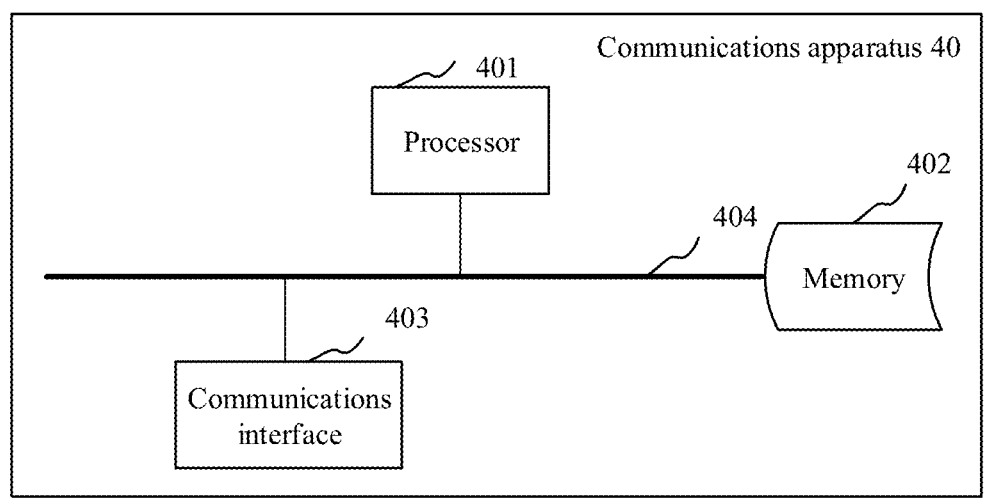

FIG. 16 is a schematic structural diagram of a communications apparatus according to still another embodiment of this application. As shown in FIG. 16, the communications apparatus 40 may include a processor 401 (for example, a CPU), configured to implement a function of the network device in the methods provided in the embodiments of this application. The apparatus 40 may further include a memory 402 and/or a communications interface 403. Information may be sent and/or received through the communications interface 403. The memory 402 may store a program instruction. When the processor 401 invokes and executes the program instruction stored in the memory 402, the function of the network device in the methods provided in the embodiments of this application may be implemented.

In one embodiment, the communications apparatus 40 may further include a power supply 404 and/or a communications bus 405. The communications bus 405 is configured to implement communication connection between elements.

All or some of the foregoing methods in the embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of the application are all or partially generated. The computer may be a general-purpose computer, a dedicated computer, a computer network, a network device, user equipment, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:
1. A synchronization signal block transmission method comprising:
    sending a synchronization signal block (SSB) to a terminal device in a resource position of the SSB, wherein the resource position of the SSB is comprised in a candidate resource position set of the SSB, and the SSB comprises a primary synchronization signal (PSS), a secondary synchronization signal (SSS), and a physical broadcast channel (PBCH), wherein,
    one resource position in the candidate resource position set is mapped to one symbol in time domain, the PSS, the SSS, and the PBCH are frequency-division multiplexed in the resource position, and a subcarrier spacing corresponding to the resource position is 15 kHz, 30 kHz, or 60 kHz.

2. The method according to claim 1, wherein,
when the subcarrier spacing is 15 kHz, the candidate resource position set is a first set or a subset of the first set, and indexes of a symbol in the first set are $\{0, 7, 14, 21\}+28\times a$, wherein $a\geq 0$ and a is an integer; or
when the subcarrier spacing is 30 kHz, the candidate resource position set is a second set or a subset of the second set, and indexes of a symbol in the second set are $\{0, 1, 7, 8, 14, 15, 21, 22\}+28\times b$; or
when the subcarrier spacing is 60 kHz, the candidate resource position set is a third set or a subset of the third set, and indexes of a symbol in the third set are $\{0, 1, 2, 3, 7, 8, 9, 10, 14, 15, 16, 17, 21, 22, 23, 24\}+28\times c$, wherein $c\geq 0$ and c is an integer.

3. The method according to claim 1, wherein a quantity of resource blocks (RBs) to which the SSB is mapped in frequency domain is less than or equal to 72, wherein the PSS and the SSS each are mapped to 12 RBs in frequency domain, and a quantity of RBs to which the PBCH is mapped in frequency domain is less than or equal to 48.

4. The method according to claim 1, wherein after the sending a synchronization signal block (SSB) to a terminal device in a resource position of the SSB, the method further comprises:
sending first indication information to the terminal device, wherein the first indication information is used to indicate, to the terminal device, the resource position that is in the candidate resource position set and that is used to transmit the SSB.

5. The method according to claim 4, wherein the first indication information is further used to indicate a first candidate resource position set, the first candidate resource position set is a subset of the candidate resource position set, the candidate resource position set comprises L resource positions, sequence numbers of the L resource positions are 1 to L in sequence, and the first candidate resource position set comprises an odd-numbered resource position in the L resource positions, or the first candidate resource position set comprises an even-numbered resource position in the L resource positions.

6. A communications apparatus comprising:
at least one processor; and
a communications interface, wherein,
the at least one processor is configured to receive a synchronization signal block (SSB) from a network device in a resource position of the SSB by the communications interface, wherein the resource position of the SSB is comprised in a candidate resource position set of the SSB, and the SSB comprises a primary synchronization signal (PSS), a secondary synchronization signal (SSS), and a physical broadcast channel (PBCH), wherein,
one resource position in the candidate resource position set is mapped to one symbol in time domain, the PSS, the SSS, and the PBCH are frequency-division multiplexed in the resource position, and a subcarrier spacing corresponding to the resource position is 15 kHz, 30 kHz, or 60 kHz.

7. The communications apparatus according to claim 6, wherein,
when the subcarrier spacing is 15 kHz, the candidate resource position set is a first set or a subset of the first set, and indexes of a symbol in the first set are $\{0, 7, 14, 21\}+28\times a$, wherein $a\geq 0$ and a is an integer; or
when the subcarrier spacing is 30 kHz, the candidate resource position set is a second set or a subset of the second set, and indexes of a symbol in the second set are $\{0, 1, 7, 8, 14, 15, 21, 22\}+28\times b$; or
when the subcarrier spacing is 60 kHz, the candidate resource position set is a third set or a subset of the third set, and indexes of a symbol in the third set are $\{0, 1, 2, 3, 7, 8, 9, 10, 14, 15, 16, 17, 21, 22, 23, 24\}+28\times c$, wherein $c\geq 0$ and c is an integer.

8. The communications apparatus according to claim 6, wherein a quantity of resource blocks £RBs to which the SSB is mapped in frequency domain is less than or equal to 72, wherein the PSS and the SSS each are mapped to 12 RBs in frequency domain, and a quantity of RBs to which the PBCH is mapped in frequency domain is less than or equal to 48.

9. The communications apparatus according to claim 6, wherein,
the at least one processor is configured to receive first indication information from the network device by the communications interface, wherein the first indication information is used to indicate, to a terminal device, the resource position that is in the candidate resource position set and that is used to transmit the SSB.

10. The communications apparatus according to claim 9, wherein the first indication information is further used to indicate a first candidate resource position set, the first candidate resource position set is a subset of the candidate resource position set, the candidate resource position set comprises L resource positions, sequence numbers of the L resource positions are 1 to L in sequence, and the first candidate resource position set comprises an odd-numbered resource position in the L resource positions, or the first candidate resource position set comprises an even-numbered resource position in the L resource positions.

11. A communications apparatus comprising:
at least one processor; and
a communications interface, wherein,
the at least one processor is configured to send a synchronization signal block (SSB) to a terminal device in a resource position of the SSB by the communications interface, wherein the resource position of the SSB is comprised in a candidate resource position set of the SSB, and the SSB comprises a primary synchronization signal (PSS), a secondary synchronization signal (SSS), and a physical broadcast channel (PBCH), wherein,
one resource position in the candidate resource position set is mapped to one symbol in time domain, the PSS, the SSS, and the PBCH are frequency-division multiplexed in the resource position, and a subcarrier spacing corresponding to the resource position is 15 kHz, 30 kHz, or 60 kHz.

12. The communications apparatus according to claim 11 wherein,
when the subcarrier spacing is 15 kHz, the candidate resource position set is a first set or a subset of the first set, and indexes of a symbol in the first set are $\{0, 7, 14, 21\}+28\times a$, wherein $a\geq 0$ and a is an integer; or
when the subcarrier spacing is 30 kHz, the candidate resource position set is a second set or a subset of the second set, and indexes of a symbol in the second set are $\{0, 1, 7, 8, 14, 15, 21, 22\}+28\times b$; or
when the subcarrier spacing is 60 kHz, the candidate resource position set is a third set or a subset of the third set, and indexes of a symbol in the third set are $\{0, 1, 2, 3, 7, 8, 9, 10, 14, 15, 16, 17, 21, 22, 23, 24\}+28\times c$, wherein $c\geq 0$ and c is an integer.

13. The communications apparatus according to claim 11, wherein a quantity of resource blocks (RBs) to which the SSB is mapped in frequency domain is less than or equal to 72, wherein the PSS and the SSS each are mapped to 12 RBs in frequency domain, and a quantity of RBs to which the PBCH is mapped in frequency domain is less than or equal to 48.

14. The communications apparatus according to claim 11, wherein,
   the at least one processor is configured to send first indication information to the terminal device by the communications interface, wherein the first indication information is used to indicate, to the terminal device, the resource position that is in the candidate resource position set and that is used to transmit the SSB.

15. The communications apparatus according to claim 14, wherein the first indication information is further used to indicate a first candidate resource position set, the first candidate resource position set is a subset of the candidate resource position set, the candidate resource position set comprises L resource positions, sequence numbers of the L resource positions are 1 to L in sequence, and the first candidate resource position set comprises an odd-numbered resource position in the L resource positions, or the first candidate resource position set comprises an even-numbered resource position in the L resource positions.

* * * * *